United States Patent
Cochimin et al.

[19]

[11] Patent Number: 5,863,185
[45] Date of Patent: Jan. 26, 1999

[54] LIQUID PUMPING SYSTEM WITH COOLED CONTROL MODULE

[75] Inventors: Jimmy Cochimin; Richard J. Halsey, both of Fort Wayne, Ind.

[73] Assignee: Franklin Electric Co., Bluffton, Ind.

[21] Appl. No.: 520,922

[22] Filed: Aug. 30, 1995

Related U.S. Application Data

[63] Continuation-in-part of Ser. No. 318,220, Oct. 5, 1994, abandoned.

[51] Int. Cl.$^6$ .................................................. F04B 49/06
[52] U.S. Cl. .................. 417/44.2; 417/44.7; 417/44.9; 417/43
[58] Field of Search ................................ 417/1, 43, 44.2, 417/44.7, 44.9

[56] References Cited

U.S. PATENT DOCUMENTS

| | | |
|---|---|---|
| 1,686,688 | 10/1928 | Fechheimer .............................. 73/715 |
| 1,818,132 | 8/1931 | Held . |
| 2,440,981 | 5/1948 | Smith . |
| 2,667,626 | 1/1954 | Blancher . |
| 2,919,650 | 1/1960 | Wiggermann . |
| 2,959,131 | 11/1960 | Shoosmith . |
| 2,964,941 | 12/1960 | Marsh et al. . |
| 3,013,186 | 12/1961 | Jones . |
| 3,030,892 | 4/1962 | Piccardo . |
| 3,044,402 | 7/1962 | Kreuter . |
| 3,136,924 | 6/1964 | Futral et al. . |
| 3,141,998 | 7/1964 | Silkman . |
| 3,338,170 | 8/1967 | Swartz . |
| 3,370,554 | 2/1968 | Thorpe, Sr. . |
| 3,416,461 | 12/1968 | McFarland . |
| 3,433,161 | 3/1969 | Vetter . |
| 3,466,978 | 9/1969 | Carlstedt . |
| 3,490,342 | 1/1970 | Reis . |
| 3,551,071 | 12/1970 | Hoover . |
| 3,551,072 | 12/1970 | Zimmerly . |
| 3,612,727 | 10/1971 | Drake . |
| 3,685,926 | 8/1972 | Blum . |
| 3,692,430 | 9/1972 | Timmons . |
| 3,702,742 | 11/1972 | Russell . |
| 3,719,860 | 3/1973 | Lawrence . |
| 3,738,776 | 6/1973 | Debare . |
| 3,796,516 | 3/1974 | McCormick . |
| 3,814,877 | 6/1974 | Alvarez . |
| 3,855,515 | 12/1974 | Hutchins, Jr. . |
| 3,985,467 | 10/1976 | Lefferson . |
| 4,037,045 | 7/1977 | Beriger et al. . |
| 4,051,509 | 9/1977 | Beriger et al. . |

(List continued on next page.)

FOREIGN PATENT DOCUMENTS

| | | |
|---|---|---|
| 0004056 | 9/1979 | European Pat. Off. . |
| 2373912 | 7/1978 | France . |
| 1548024 | 7/1979 | United Kingdom . |
| 1592286 | 7/1981 | United Kingdom . |

*Primary Examiner*—Timothy Thorpe
*Assistant Examiner*—Ted Kim
*Attorney, Agent, or Firm*—Marshall, O'Toole, Gerstein, Murray & Borun

[57] ABSTRACT

Apparatus comprising a flow carrier connectable in a liquid flow system including an electric motor-pump unit and a conduit for conveying a pumped liquid to a liquid utilization apparatus. The flow carrier is connectable in the conduit and includes an opening which exposes the liquid flowing through the carrier. A heat sink or cold plate is located on the carrier over the opening, the heat sink covering the opening and having a wet side exposed to the liquid. The heat sink further includes a dry side, and heat generating electrical control components are secured to the dry side. A sensor is also mounted on the heat sink and responds to a characteristic, such as the pressure, of the liquid. A heat insulating layer extends around the control components and the sensor and covers the dry side of the heat sink, the layer preventing condensation. The sensor and the control components are operable to control the motor-pump unit. In a domestic water supply system, for example, the liquid utilization apparatus includes the plumbing in a building. In a gasoline supply system, the liquid utilization apparatus comprises a gasoline dispenser.

27 Claims, 22 Drawing Sheets

U.S. PATENT DOCUMENTS

| | | |
|---|---|---|
| 4,081,621 | 3/1978 | Hartley . |
| 4,093,971 | 6/1978 | Chu et al. . |
| 4,102,394 | 7/1978 | Botts . |
| 4,120,019 | 10/1978 | Arii et al. . |
| 4,128,006 | 12/1978 | Grabow . |
| 4,145,161 | 3/1979 | Skinner . |
| 4,155,402 | 5/1979 | Just . |
| 4,160,139 | 7/1979 | Johnston . |
| 4,192,192 | 3/1980 | Schnell . |
| 4,196,775 | 4/1980 | Groh . |
| 4,204,246 | 5/1980 | Arii et al. . |
| 4,225,290 | 9/1980 | Allington . |
| 4,247,260 | 1/1981 | Schonwald et al. . |
| 4,257,395 | 3/1981 | Wieder . |
| 4,277,227 | 7/1981 | Jenkins . |
| 4,281,968 | 8/1981 | Akers . |
| 4,284,943 | 8/1981 | Rowe . |
| 4,329,120 | 5/1982 | Walters . |
| 4,344,741 | 8/1982 | Taki . |
| 4,364,386 | 12/1982 | Jenkins et al. . |
| 4,370,098 | 1/1983 | McClain et al. . |
| 4,389,163 | 6/1983 | Magnussen, Jr. et al. ............... 417/43 |
| 4,394,862 | 7/1983 | Shim . |
| 4,396,353 | 8/1983 | McDonald . |
| 4,397,610 | 8/1983 | Krohn . |
| 4,433,219 | 2/1984 | Dietz . |
| 4,442,953 | 4/1984 | Miyamoto et al. . |
| 4,462,758 | 7/1984 | Speed . |
| 4,507,053 | 3/1985 | Frizzell . |
| 4,532,893 | 8/1985 | Day et al. . |
| 4,600,844 | 7/1986 | Atkins . |
| 4,624,309 | 11/1986 | Schnatzmeyer . |
| 4,627,243 | 12/1986 | Schaub . |
| 4,660,638 | 4/1987 | Yates, Jr. . |
| 4,664,185 | 5/1987 | Barnard . |
| 4,678,404 | 7/1987 | Lorett et al. . |
| 4,686,439 | 8/1987 | Cunningham et al. . |
| 4,718,824 | 1/1988 | Cholet et al. . |
| 4,733,152 | 3/1988 | Allington . |
| 4,741,208 | 5/1988 | Vandevier . |
| 4,795,314 | 1/1989 | Prybella et al. . |
| 4,834,624 | 5/1989 | Jensen et al. . |
| 4,840,068 | 6/1989 | Mayhew, Jr. . |
| 4,841,404 | 6/1989 | Marshall et al. . |
| 4,874,294 | 10/1989 | Karg . |
| 4,948,349 | 8/1990 | Koiwa . |
| 4,965,415 | 10/1990 | Young et al. . |
| 4,965,697 | 10/1990 | Mosser et al. . |
| 4,987,953 | 1/1991 | Hedstrom . |
| 5,015,151 | 5/1991 | Snyder, Jr. et al. . |
| 5,040,126 | 8/1991 | Allington . |
| 5,064,347 | 11/1991 | LaValley, Sr. . |
| 5,074,755 | 12/1991 | Vincent . |
| 5,138,414 | 8/1992 | Shinohara . |
| 5,145,323 | 9/1992 | Farr . |
| 5,162,624 | 11/1992 | Duksa . |
| 5,197,859 | 3/1993 | Siff . |
| 5,222,867 | 6/1993 | Walker, Sr. et al. . |
| 5,238,369 | 8/1993 | Farr . |
| 5,240,380 | 8/1993 | Mabe . |
| 5,244,350 | 9/1993 | Yang . |
| 5,282,722 | 2/1994 | Beatty . |
| 5,462,256 | 10/1995 | Minick et al. . |
| 5,518,371 | 5/1996 | Wellstein et al. ...................... 417/44.9 |

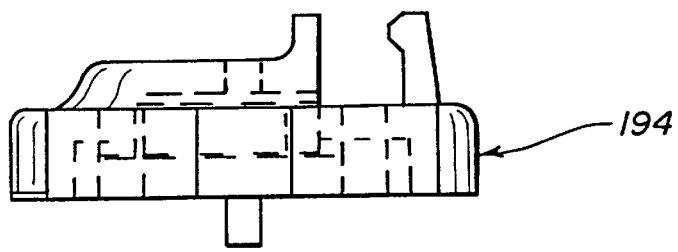
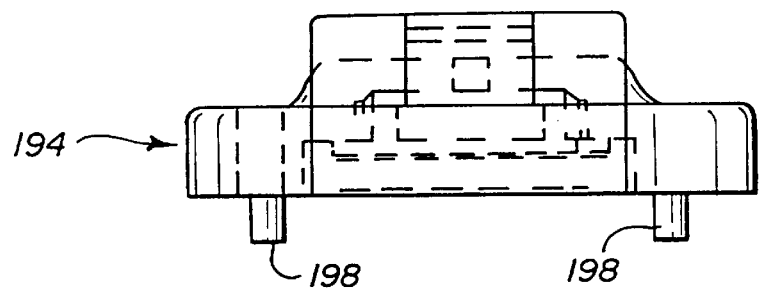
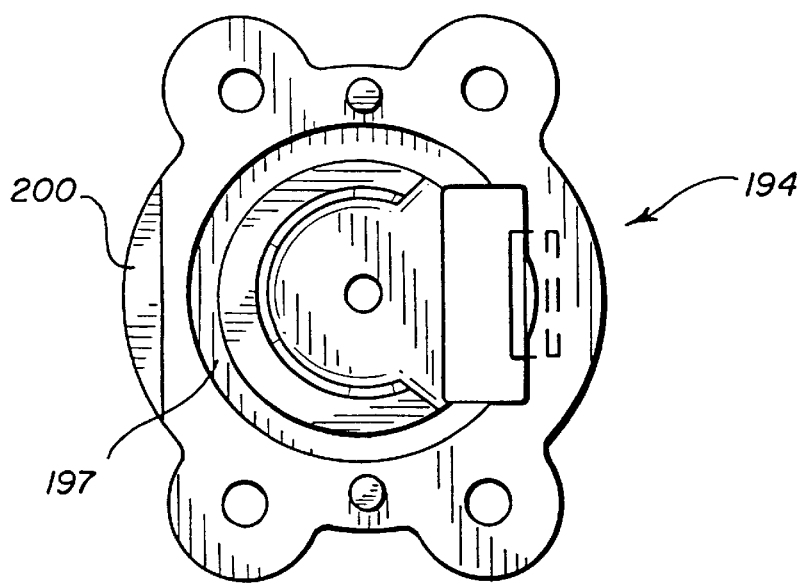

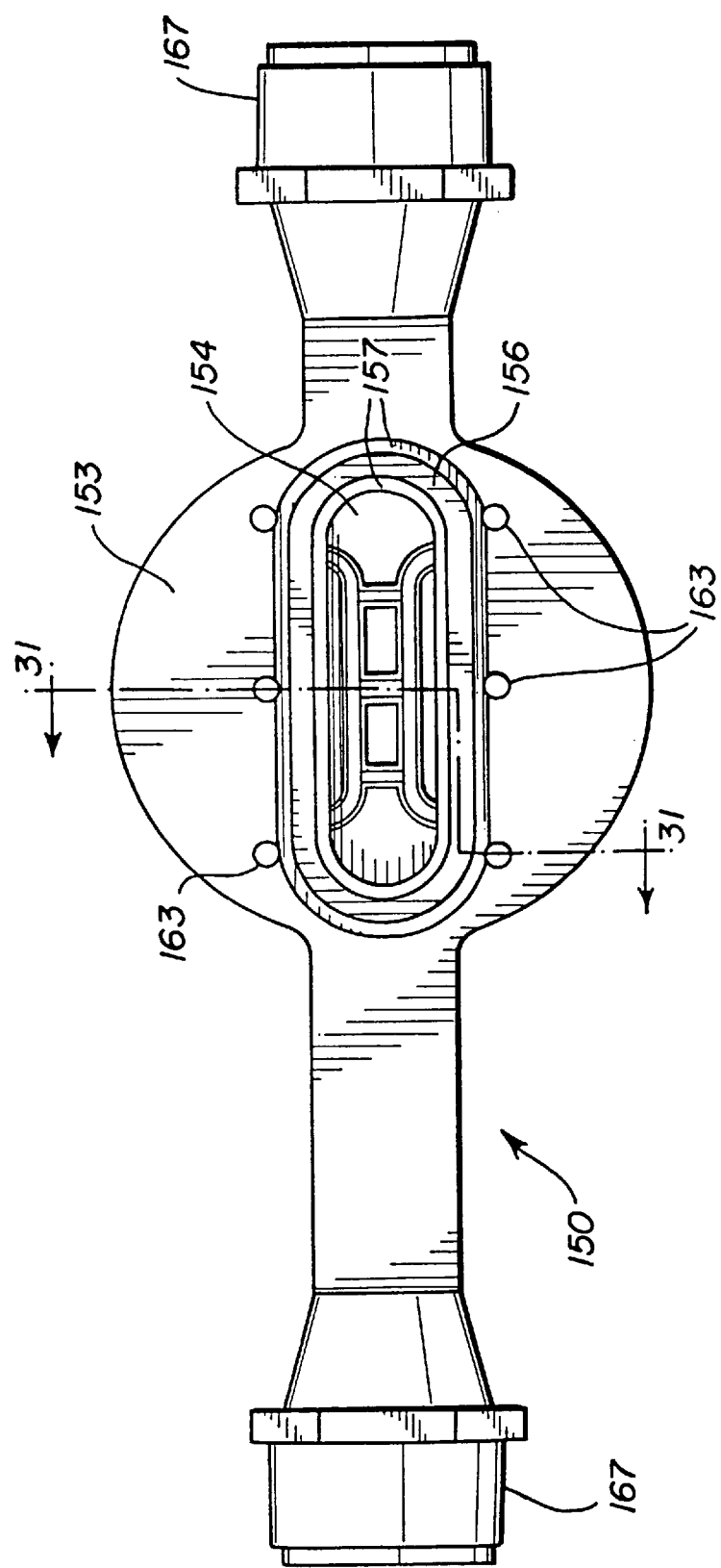

LIQUID PUMPING SYSTEM WITH COOLED CONTROL MODULE

RELATED APPLICATIONS

This application is a continuation-in-part of application Ser. No. 08/318,220 filed Oct. 5, 1994 and titled "Liquid Pumping System", now abandoned.

FIELD AND BACKGROUND OF THE INVENTION

This invention relates generally to a pumping or liquid flow system, and more particularly to such a system including at least one heat generating control component for a motor-pump unit and apparatus for cooling the control component, and to apparatus for sensing the pressure of the liquid.

Pumping systems including electric motor-pump units are well known and in common use. Examples include residential water supply systems and gasoline dispensing systems in service stations. A typical water supply system includes a motor-pump unit in a well, a water pipe connected to the unit and extending out of the well to a pressure tank, and a control that senses the water pressure in the tank and controls the unit to maintain the pressure in a selected pressure range.

Traditionally mechanical pressure gauges are used to monitor the flow pressure through such a system. Normally these pressure gauges are mounted on flow pipes whose pressures are to be monitored, using pipe stands or stubs. One popular method of mounting is to provide a bored hole in the pipe, the hole is then threaded, and then a small pipe stand or stub having male threads at one end and a pressure gauge on the opposite end is screwed into the hole. Flow pressure is transmitted to the pressure gauge through the pipe stub to the pressure gauge.

There are numerous commercially available pressure sensors for use with pipe stubs. Most of these pressure sensors incorporate a chamber having a diaphragm with an inlet on one side of the diaphragm and an outlet on the other side of the diaphragm. The pressure sensing inlet normally has female threads for receiving male threads of the pipe stub and a narrow passage filled with a liquid, such as oil, is on the other side of the diaphragm. Water pressure in the pipe causes movement of the diaphragm which, in turn, moves the liquid in the stub on the other side of the diaphragm. Movement of this liquid in the narrow passage causes movement of an indicator to monitor pressure in the pipe.

In the foregoing arrangement the small measuring passage located above the diaphragm often must be filled with oil. This presents a manufacturing problem because such a narrow passage is very difficult to fill with oil or any other liquid without leaving an air bubble therein. In order to properly fill such a gauge with the liquid needed for its functioning, it is therefore necessary first to apply a vacuum to the passage. It is an advantage of this invention that a pressure sensing mechanism is provided for a motor-pump system which can be easily mounted and filled but yet does not require the use of a filling oil and the need for pulling a vacuum.

Some pressure sensor installations require on the site opening of the wall of a pipe on which the pressure gauge is installed. For example, some require holes in the walls of the pipes and some require protrusions in the walls of the pipes. Such operations are expensive and difficult to incorporate. Another advantage of this invention is that a pressure sensing mechanism is provided which when installed becomes in-line with the pipe line and is relatively inexpensive to manufacture and install.

One prior art device for pipe pressure sensing comprises a part that defines a hollow chamber which is fastened onto a pipe to clamp a diaphragm between the pipe and a portion of the chamber unit surrounding a pressure inlet opening into the chamber. The diaphragm has a round, sensing protrusion with a sensing tip on an outer end thereof, which extends outwardly from one side of the diaphragm and extends through a round hole in the pipe so as to communicate the pressure in the pipe to the chamber. Although this design presents some improvement over the others, it also utilizes a mechanical interface among liquid, diaphragm, and liquid again to convey the pressure in the pipe to the gauge. It is another advantage of the present invention that it includes a mechanical-electrical transducer which more accurately measures the pressure in a motor-pump system.

Various types of pipe pressure sensors can only be used with specific types of pipe, but it is an advantage of this invention that a pipe pressure sensor is provided which can be used with various types of pipe including both plastic and metal pipes.

Control units for pump-motor units including electronics are typically cooled by air cooling through a metallic radiating panel used as a heat sink or a cooling plate. Various types of stock heat sinks are commercially available. Due to the low convective ability of air cooling, the size of such heat dissipating devices is relatively large compared with the overall size of the control package itself. The broad concept of cooling electrical devices by means of a flowing medium was introduced some time ago. In one particular design a closed recirculation cooling system was developed to cool electrodes at different electrical potentials. An advantage of the present invention is that the size of packaging is reduced by using a liquid cooling medium in lieu of the well known air cooling method.

In another prior art design, a printed circuit board package for high density packaging includes electronic circuit components cooled by a liquid cooled cold plate or heat sink. A circulating coolant is also included. A compliant interface including a heat conductive and electrically insulative paste between the cold plate and the circuit components is provided. The paste, which flows like a highly viscous liquid, is used in conjunction with a deformable thin film to compensate for any variations or irregularities so as to conform with the surfaces of the individual circuit packages.

An objective of the present invention is to utilize a flow medium of the motor-pump system as a coolant to remove the heat generated by the electrical components, by incorporating a heat sink in the motor-pump system that is cooled directly by the liquid medium in the system, and to avoid the use of any deformable fill or heat conductive paste for mounting the electrical components.

It is a further general object of the present invention to provide a compact system including a pressure sensor and a heat sink in one integral module, thus making the module easy to install in a motor-pump system using only ordinary plumbing tools.

It is a still further general object of the present invention to provide an improved apparatus including means for avoiding damage to the parts from condensation.

SUMMARY OF THE INVENTION

Apparatus constructed in accordance with the present invention comprises a flow carrier connectable in a liquid flow system including an electric motor-pump unit and a conduit for conveying a pumped liquid to a liquid utilization apparatus. The flow carrier is connectable in the conduit and includes an opening which exposes the liquid flowing through the carrier. A heat sink or cold plate is located on the carrier over the opening, the heat sink covering the opening and having a wet side exposed to the liquid. The heat sink further includes a dry side, and heat generating control components are secured to the dry side. A sensor is also mounted on the heat sink and responds to a characteristic, such as the pressure, of the liquid. The sensor and the control components are operable to control the motor-pump unit. The invention further comprises a novel pressure sensor including a diaphragm having a seal. The invention further comprises means for avoiding condensation on the dry side of the heat sink and for holding the control components securely in place.

In a domestic water supply system, for example, the liquid utilization apparatus includes the plumbing in a building. In a gasoline supply system, the liquid utilization apparatus comprises a gasoline dispenser.

BRIEF DESCRIPTION OF THE DRAWINGS

The invention will be better understood from the following detailed description taken in conjunction with the accompanying figures of the drawings, wherein:

FIG. 24 is a bottom view of the sensor cup;

FIG. 25 is a view of one side of the sensor cup;

FIG. 26 is a view of another side of the sensor cup;

FIG. 27 is a plan view of a flow carrier of the apparatus of FIG. 16;

DETAILED DESCRIPTION OF THE INVENTION

Figure 1:
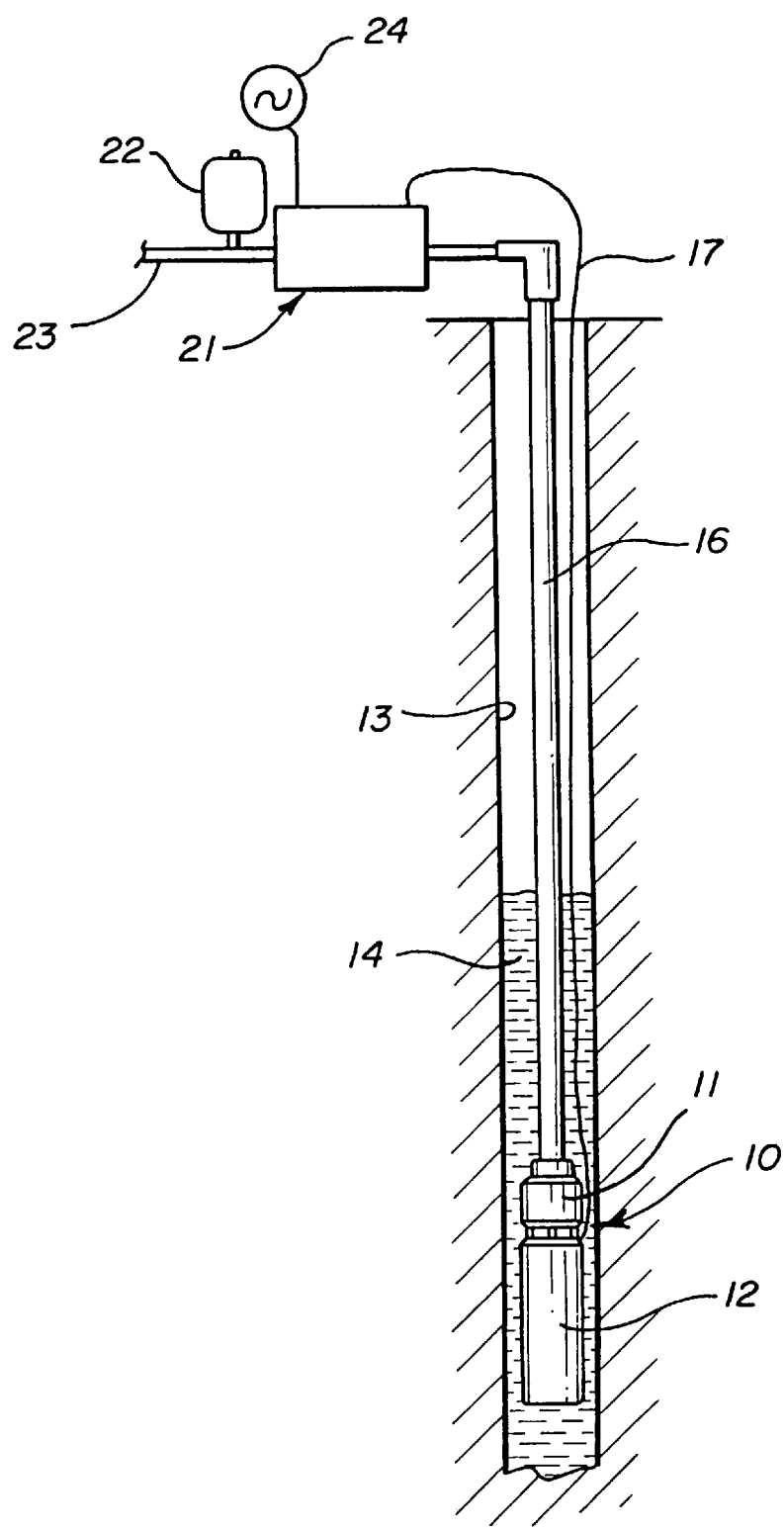
FIG. 1 is a schematic illustration of a domestic water supply system including apparatus incorporating the invention.

While FIG. 1 illustrates a domestic water supply system, it will be apparent that the invention may also be useful in other areas. The water supply system includes a unit 10 including a pump 11 driven by an electric motor 12. The unit 10 is located in a well 13 containing water 14. The unit 10 is suspended in the well by a pipe 16 which also conveys the pumped water to the ground surface. A drop cable 17 connects electric power to the motor 12.

At the surface, and normally within a home in a domestic water supply system, is located a control unit 21 that is connected to the pipe 16, as will be described. The pipe 16 is connected to fill a pressure tank 22 and to supply water to a pipe 23 of the plumbing of the residence. The cable 17 is also connected to the control unit 21, and the unit 21 controls the supply of electrical power from a typical AC power supply 24 such as a 220 volt, 60 cycle supply.

In other types of systems, such as a gasoline pumping system of a filling station, for example, the pressure tank 22 would not be provided but other controls and sensors (not shown) may be provided.

Figure 2:
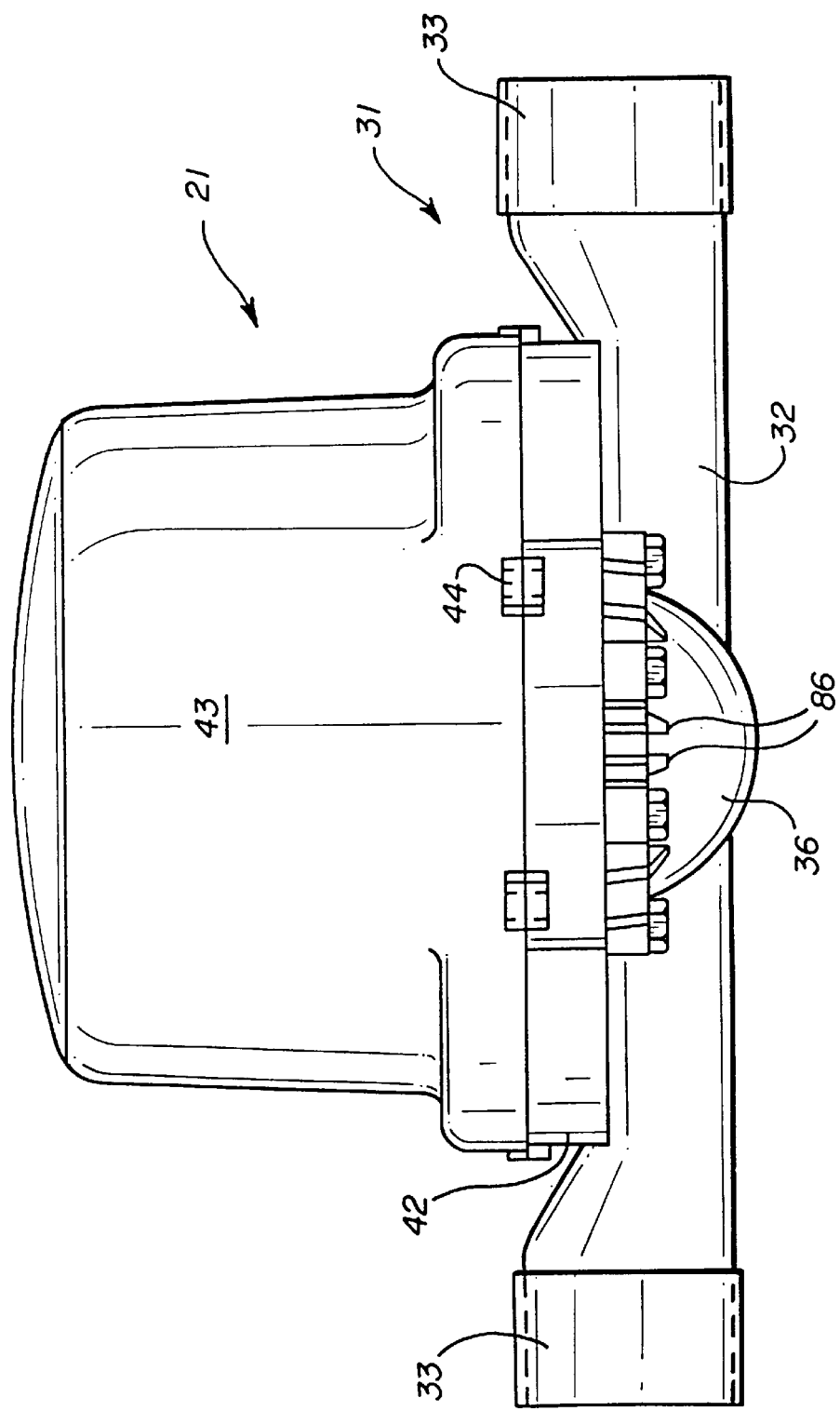
FIG. 2 is an elevational view of a flow carrier of the apparatus.
Figure 3:
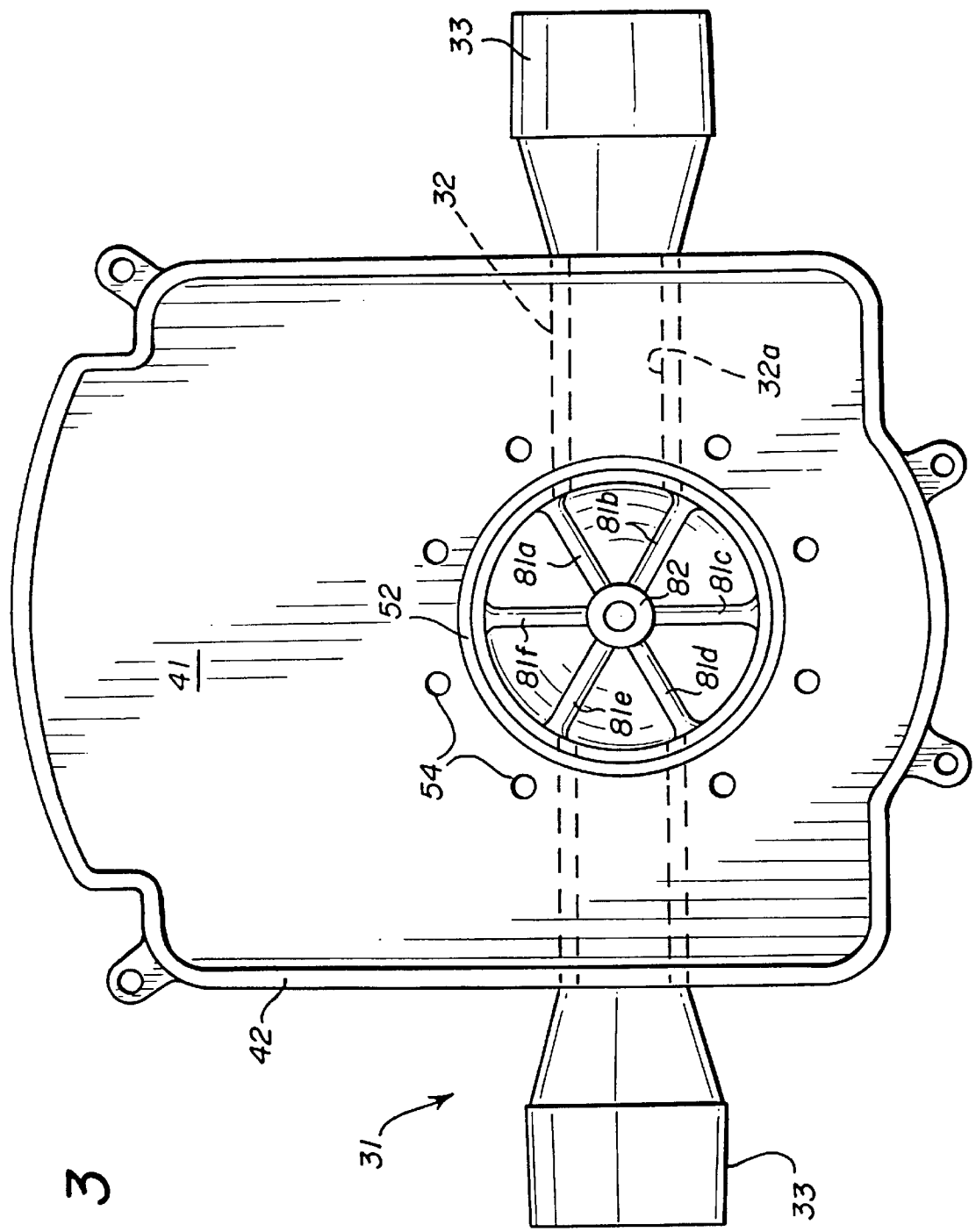
FIG. 3 is a plan view of the flow carrier.
Figure 4:
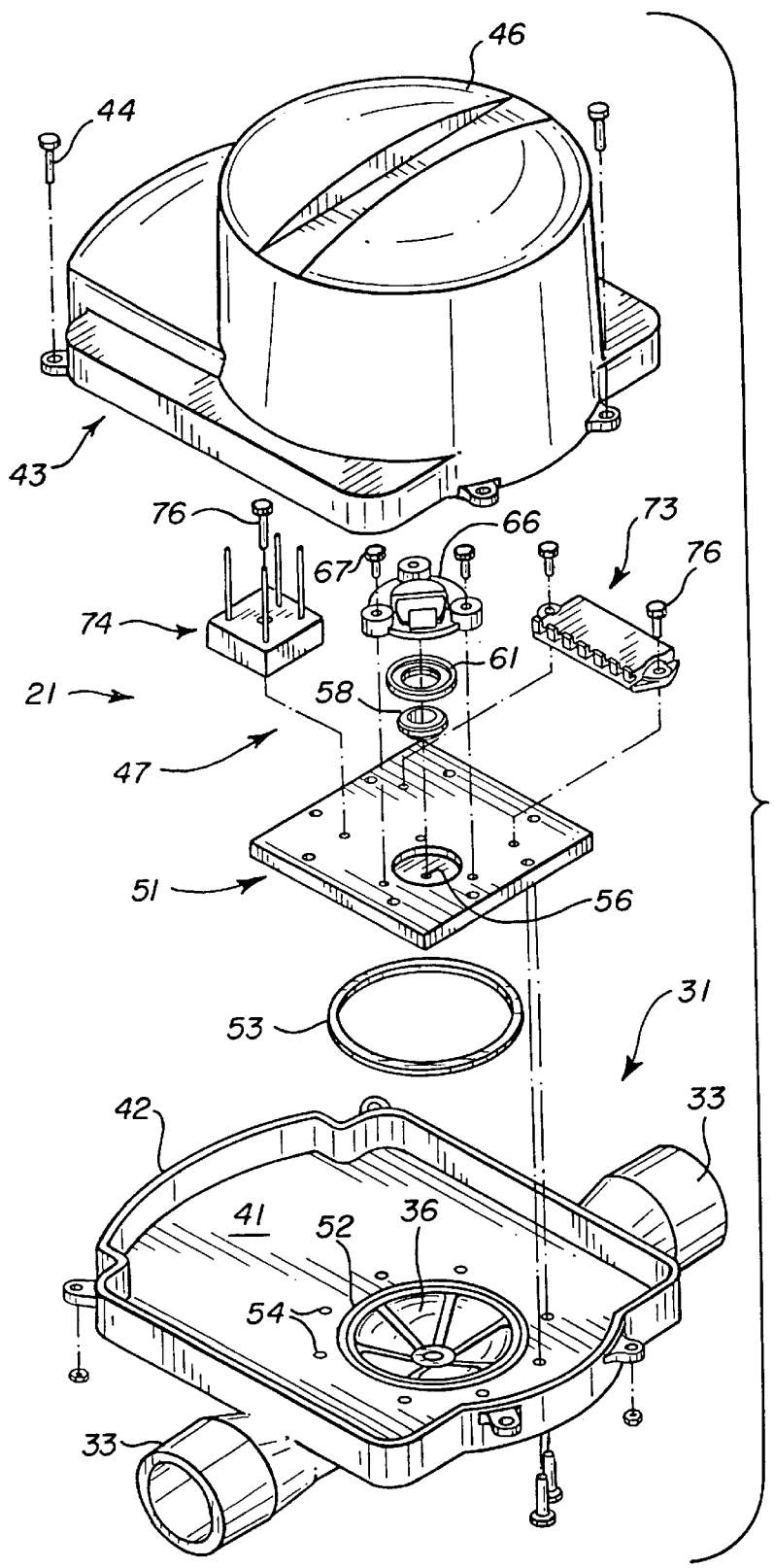
FIG. 4 is an exploded perspective view of the carrier.
Figure 8:
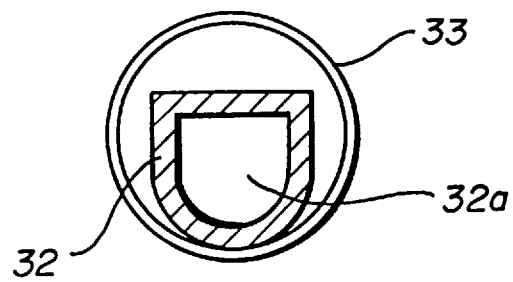
FIG. 8 is a sectional view taken on the line 8—8 of FIG. 6.
Figure 9:
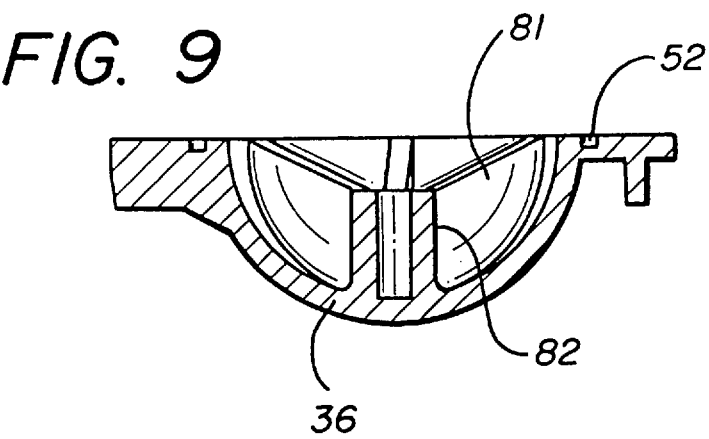
FIG. 9 is a sectional view taken on the line 9—9 of FIG. 6.

With reference to FIGS. 2, 3 and 4, the control unit 21 includes a flow carrier 31 which is connected between the pipes 16 and 23. The carrier 31 includes a conduit 32 (see FIG. 8) including threaded couplings at its ends 33 for connections between the pipe 16 and the pipe 23, and it forms a flow passage 32a between the ends 33. At approximately the center of the carrier 31, the conduit 32 is enlarged to form a generally semi-spherical dome or bulb 36 which is solid on the underside (as seen in FIGS. 2 and 4) and has a flat upper side with an opening therein. Between the bulb 36 and each of the ends 33, the conduit 32 has a substantially rectangular cross-section and has a flat side that is substantially coplanar with the flat upper side of the bulb. The ends 33 are enlarged and threaded for coupling with the pipe 23.

In the example of the invention illustrated in FIGS. 2–4, the carrier 31 includes a plate 41 which is formed integrally with the flat upper sides of the conduit 32 and the bulb 36. The carrier 31 may be formed of a cast or molded metal or suitable plastic such as a polymer, for example. As shown in FIG. 4, the opening in the upper side of the bulb 36 appears as a circle in the plate 41. An upwardly turned flange or rim 42 is formed around the periphery of the plate 41, and a cover 43 fits around the rim 42 and is fastened by bolts 44 to the carrier 31. The cover 43 is enlarged as indicated at 46 in the area above the bulb 36, and the parts 41 and 43 form an enclosure for a control package 47 including heat generating electronics.

Figure 5:
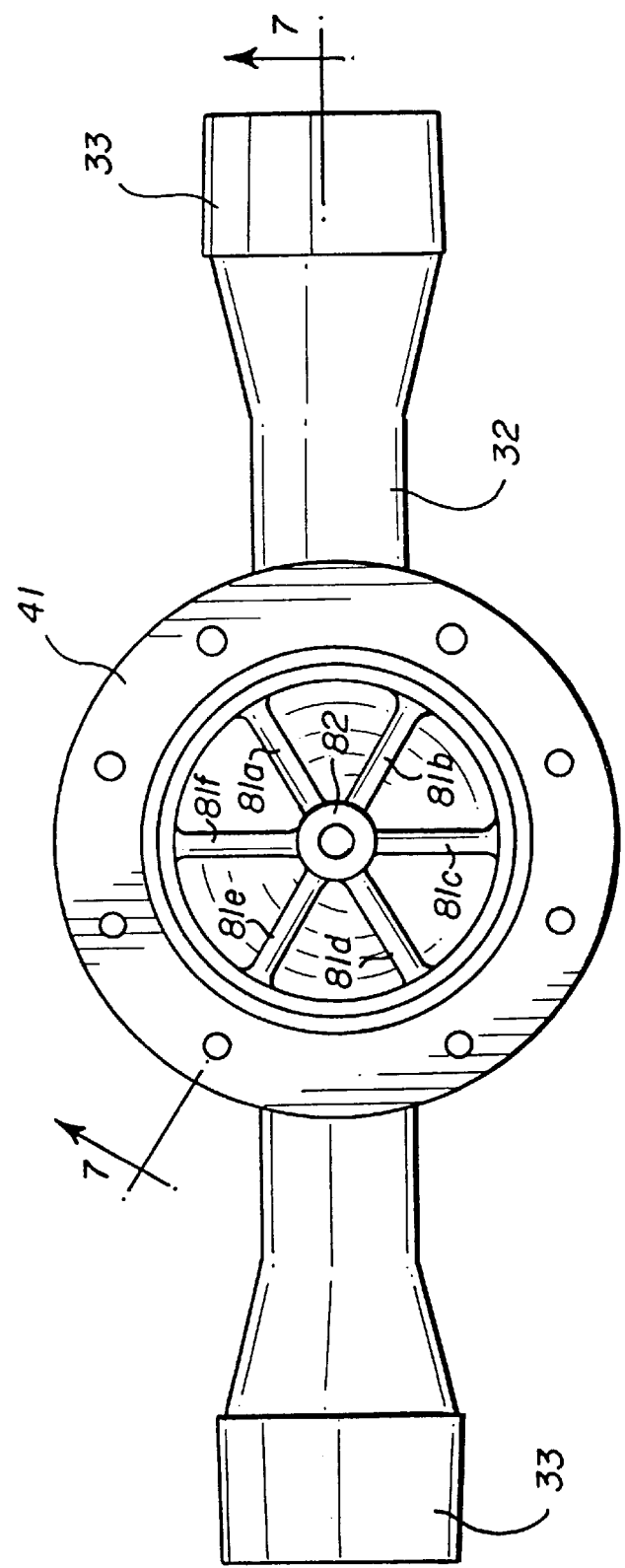
FIG. 5 is a top plan view of the carrier.
Figure 6:
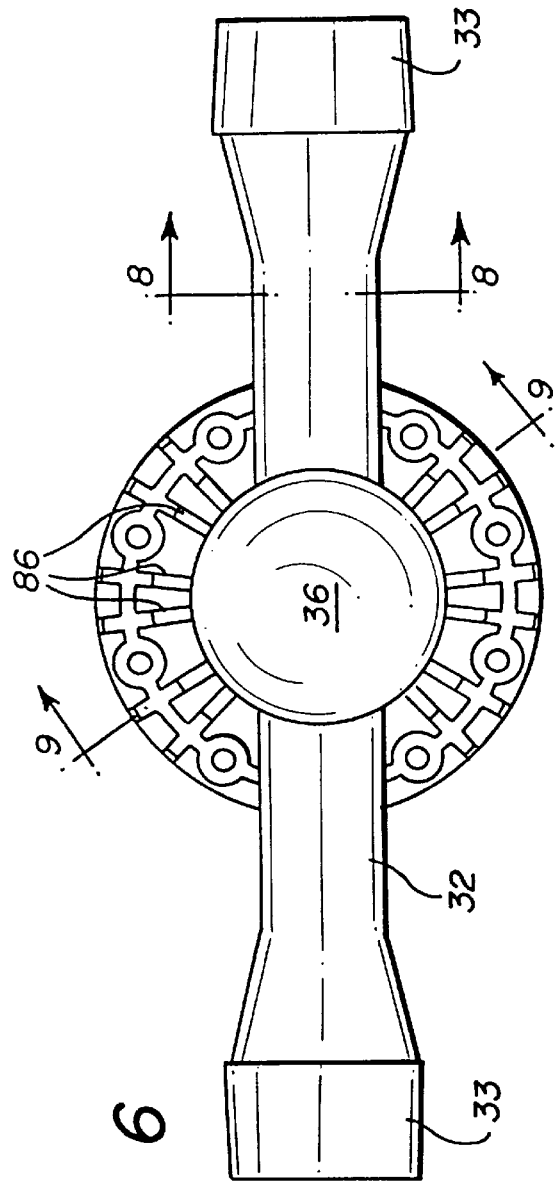
FIG. 6 is a bottom plan view of the carrier.
Figure 7:
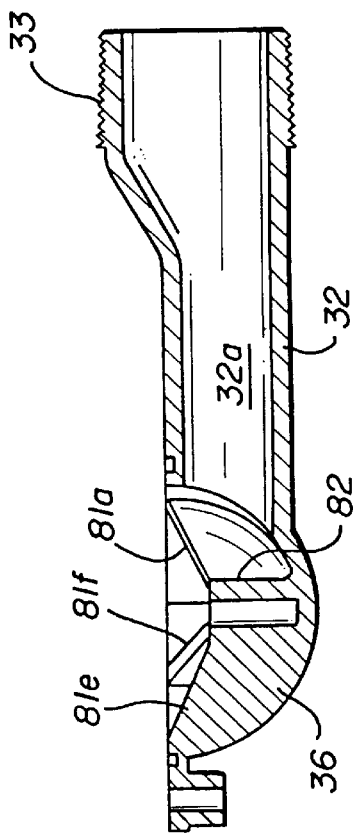
FIG. 7 is a sectional view taken on the line 7—7 of FIG. 5.

In FIGS. 5, 6 and 7, the entire plate 41 is not illustrated; instead, only an annular portion of the plate 41, surrounding the opening of the bulb 36, is shown. The annular portion may be extended to form the entire bottom wall of an enclosure as shown in FIG. 3, or a separate enclosure may be mounted on top of the annular portion as shown in FIGS. 12–15.

Figure 10:
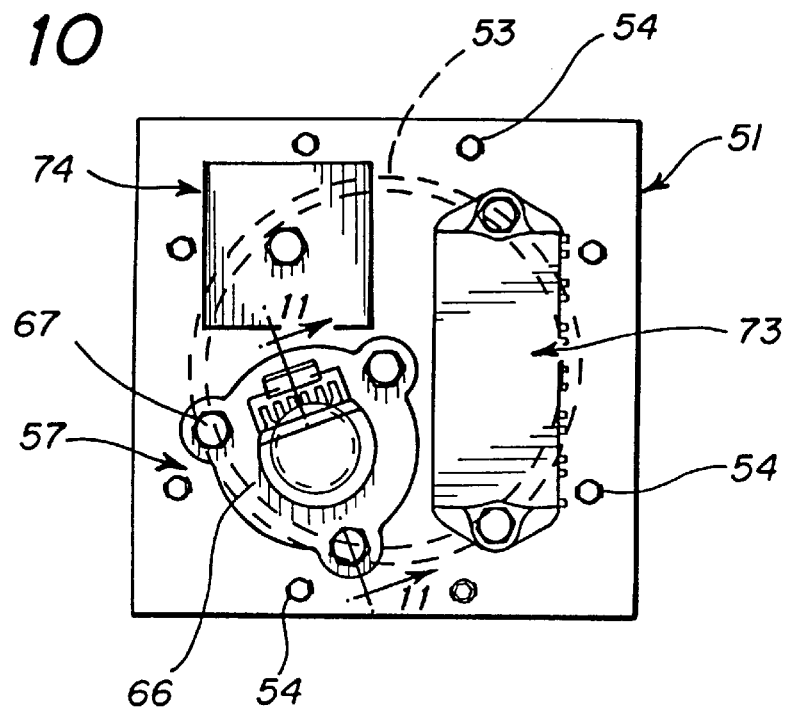
FIG. 10 is an enlarged view of part of the carrier.

A flat thermally conductive plate 51 (preferably made of metal) is positioned over the open upper side of the bulb 36 (see FIGS. 4, 10 and 11) and forms a heat sink or cold plate. Around the open upper side of the bulb 36 is an annular seal groove 52, and a seal 53 (FIGS. 4 and 10) is mounted in the groove 52 and forms a seal between the plate 41 and the underside of the cold plate 51 which in this instance is substantially square as shown in FIGS. 4 and 10. A series of holes 54 are formed in the plate 51 and in the carrier 31 radially outside the seal 53, and screws secure the plate 51 to the plate 41. A hole 56 is formed in plate 51, and a sensor 57 is mounted on the plate 51 above the hole 56.

Figure 11:
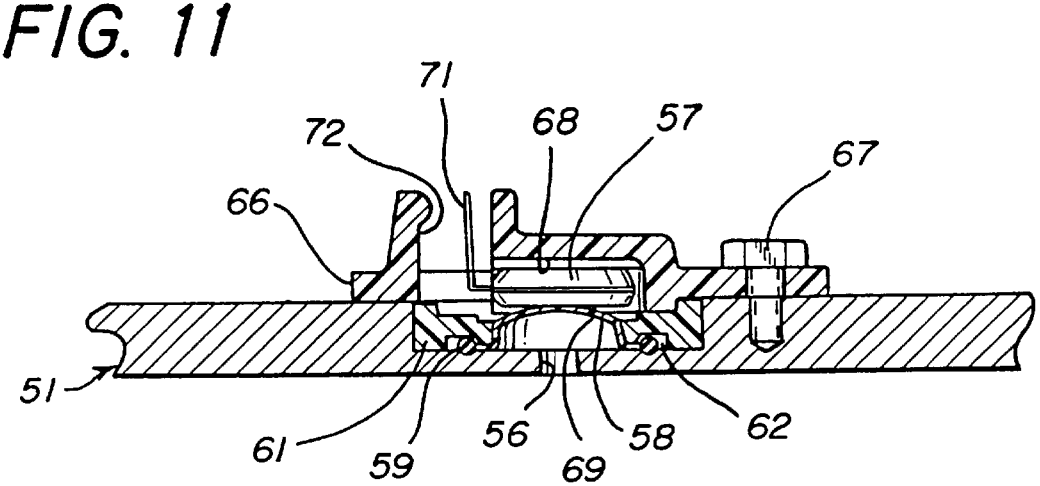
FIG. 11 is a further enlarged sectional view taken on the line 11—11 of FIG. 10.
Figure 12:
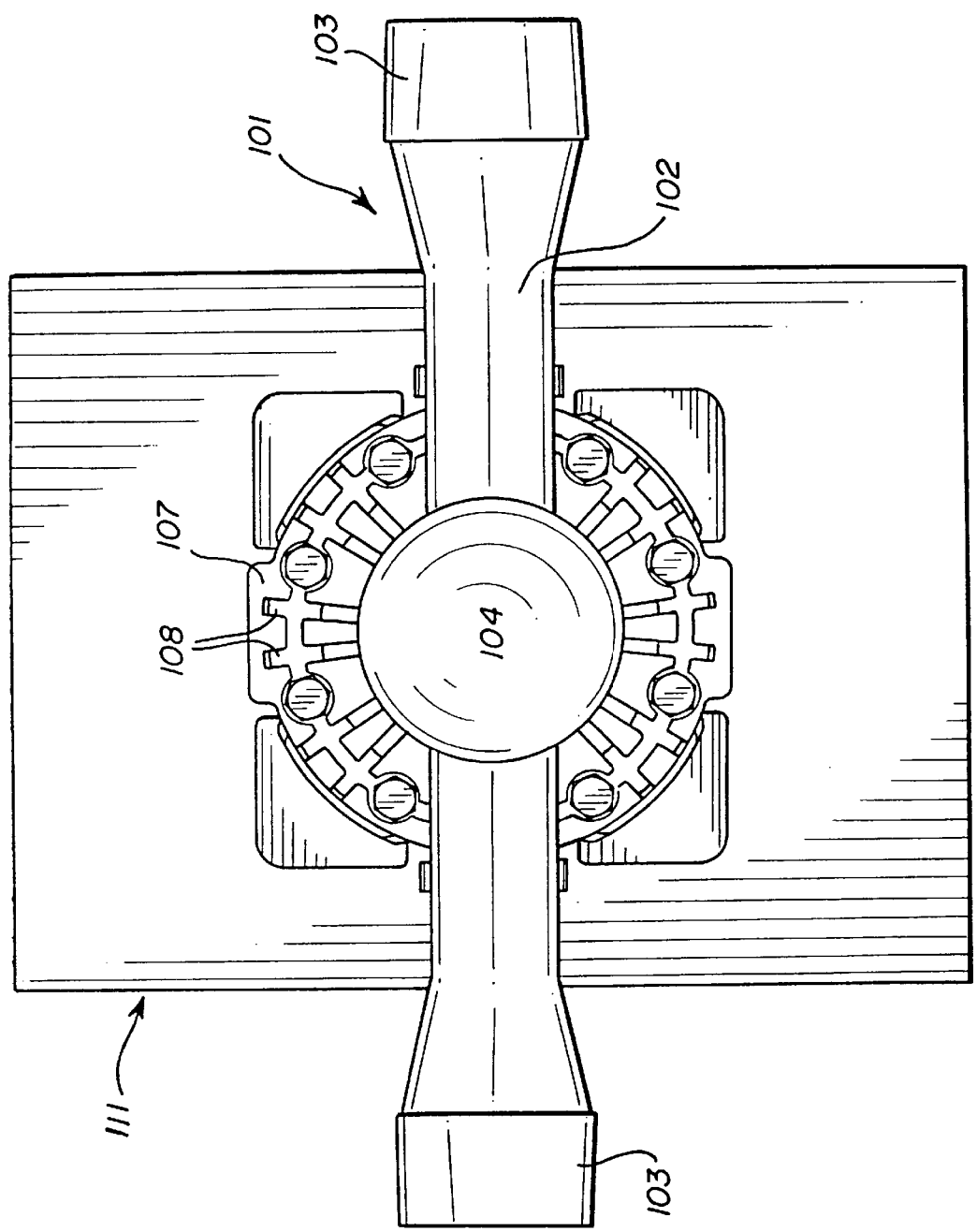
FIGS. 12 to 15 show an alternative construction of a flow carrier.
Figure 13:
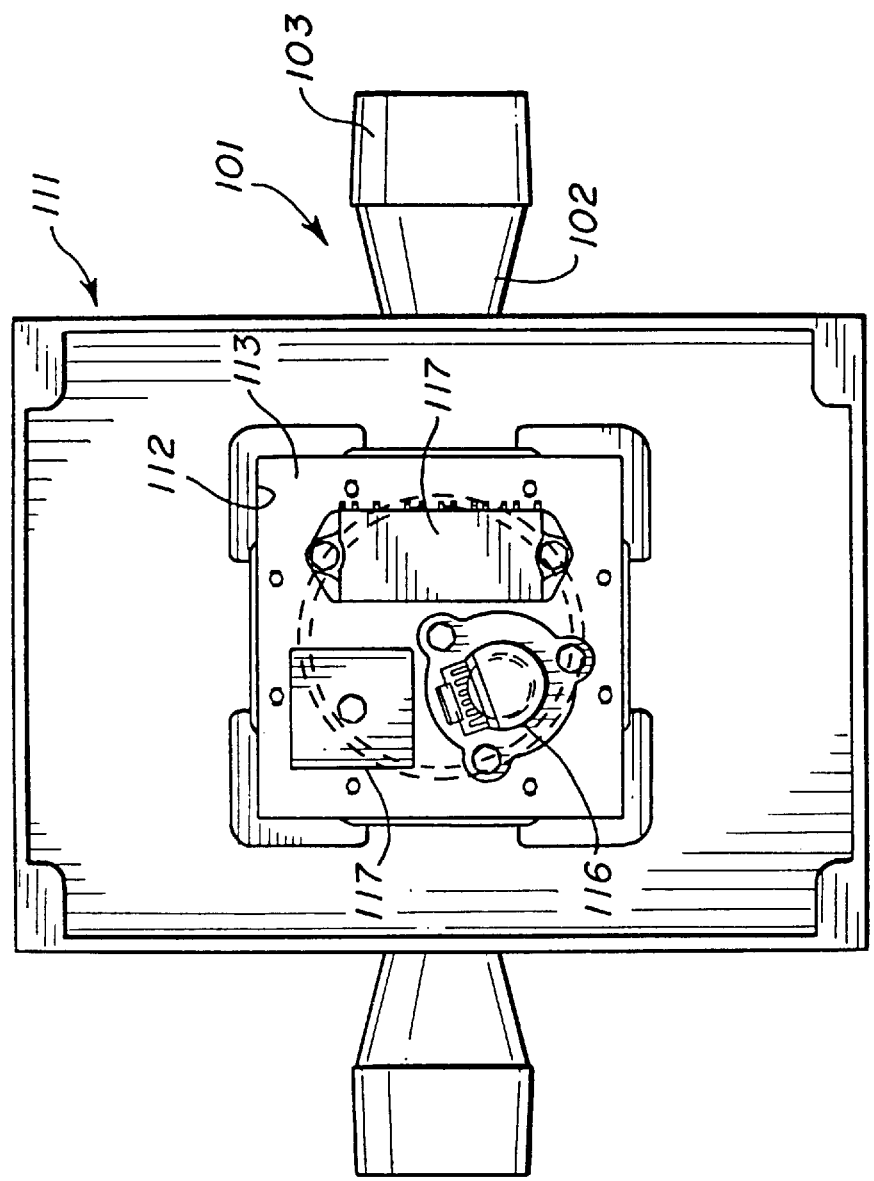
Figure 14:
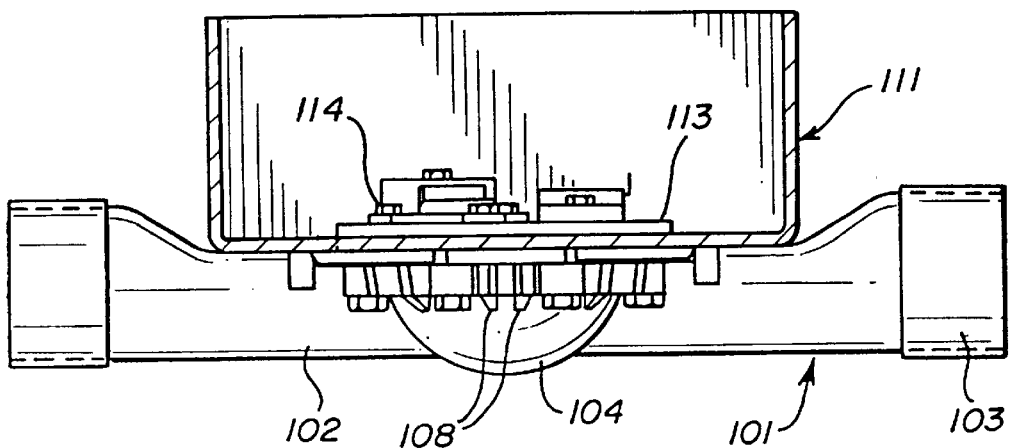
Figure 15:
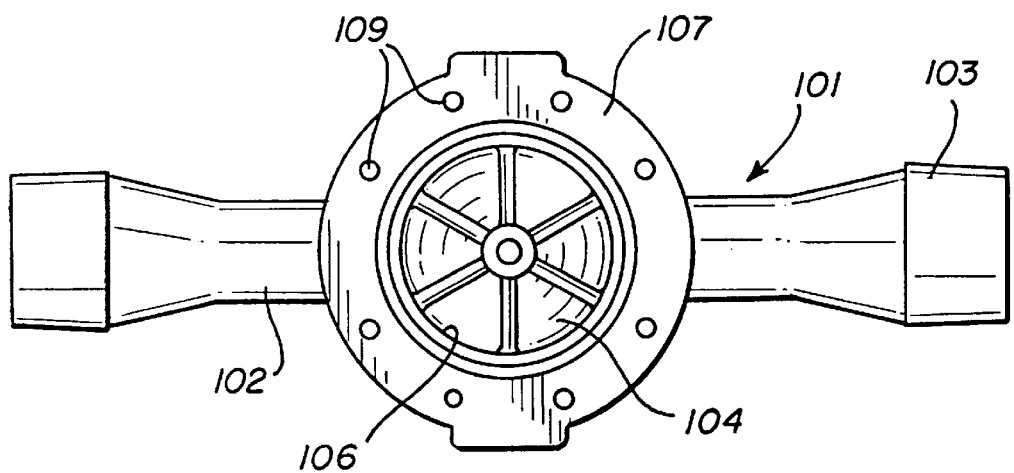

In the present example, the sensor 57 comprises a liquid pressure sensor best shown in FIG. 11. An annular diaphragm 58 is positioned over the upper side of the hole 56, and an O-ring 59 is formed integrally with the outer periphery of the diaphragm. An annular diaphragm clamp 61 is positioned over the outer periphery of the diaphragm 58 and a groove 62 in the clamp receives the O-ring 59, thereby forming a seal around the hole 56, between the lower side of the clamp 61 and the upper side of the plate 51.

A sensor cup 66 is positioned over the diaphragm clamp 61 and is secured to the plate 51 by screws 67, the cup 66 serving to hold the clamp 61 and the diaphragm 58 on the plate 51. The cup 66 forms a cavity 68 which contains and holds the sensor 57 which is positioned against the upper side of the diaphragm 58.

The sensor 57, in this specific example, is a pressure sensor that produces an analog electric signal which is representative of the liquid pressure. The bottom side 69 of the sensor is accessible for pressure sensing and is pressed upwardly by the liquid pressure acting on the diaphragm 58. The sensor may, for example, be formed by a variable resistance strain gauge, or it may be formed by a variable resistor connected in a Wheatstone bridge arrangement. Electrical leads 71 are connected to the sensor 57 and extend out of the cup 66 through an opening 72.

The control 47 further includes electronic components 73 and 74 which are secured to the upper dry side of the plate 51 by screws 76. The components 73 and 74 are power components which generate heat during use, and they are part of the control circuit for the motor 12. In the present example, the control circuit comprises a conventional DC link arrangement and the motor 12 is a three-phase synchronous variable speed motor. The component 74 comprises an AC to DC rectifier and the component 73 comprises a DC to variable frequency AC inverter. The power supply 24 (FIG. 1) is connected to the rectifier 74 and the output of the inverter 73 is connected to the drop cable 17 and to the motor 12. The pressure sensor 57 has its output signal connected in the DC link to control the frequency of the inverter output. The DC link preferably also includes ramp circuits, as is well known to those skilled in this art. The specific construction of the motor control circuit does not form part of the present invention; the control circuit may have the construction disclosed in U.S. Pat. No. 5,580,221 which is incorporated herein by reference.

It is an important feature of the present invention that the components in need of cooling are mounted directly on the upper side (the dry side) of the cold plate 51 and that the bottom side (the wet side) of the plate 51 is directly exposed to the liquid flowing through the conduit 32, and that the components in need of cooling control the motor 12 and the flow of the cooling liquid. Consequently, the cooling liquid flows while the components are generating heat. Further, the invention utilizes as a coolant a liquid which is being circulated for another purpose (i.e., the invention does not require a separate dedicated cooling arrangement). Further, the liquid acts essentially directly on the sensor 57 because only the diaphragm 58 is interposed between them.

The semi-spherical dome or bulb 36 forms a relatively large opening and therefore the plate 51 has a large surface area in contact with the cooling liquid. FIGS. 3, 5, 7 and 9 show that the interior of the bulb includes a plurality of radial ribs 81a to 81f and a center post portion 82 which connects the radially inner ends of the ribs. As shown, for example, in FIG. 3, the radially outer ends of the ribs 81a and 81b connect with the bulb 36 on opposite sides of the inlet flow area of the conduit 32, and the ribs 81d and 81e also connect with the bulb 36 on opposite sides of the outlet flow area of the conduit 32. As shown in FIG. 7, the upper edges of the ribs taper downwardly toward the post 82 and are spaced from the lower side of the plate 51. The liquid enters the bulb 36 between the ribs 81a and 81b, flows through the flow area between the upper edges of the ribs and the plate 51, and flows out of the bulb between the ribs 81d and 81e. The flow area between the plate 51 and the upper edges of the ribs is preferably less than the flow area 32a (see FIG. 8) of the conduit 32, whereby the velocity of the liquid flow is increased underneath the plate 51. Further, the relatively large opening of the upper side of the bulb forms a relatively large area of the plate where the liquid cools (or draws heat away from) the plate 51. For example, the diameter of the opening of the bulb 36 is preferably in the range of from 1.5 to 5.0 times the outer diameter of the conduit 32. In addition to accelerating the liquid flow, the ribs also serve to strengthen the bulb. A plurality of radially extending strengthening ribs 86 (FIGS. 2 and 6) may also be formed on the exterior of the bulb.

Apparatus in accordance with the invention also has the following listed advantages:

1. A single integral package includes a control, heat sink and sensor.
2. It may be installed using ordinary plumbing tools.
3. It is compact in size but is high in cooling efficiency per unit area.
4. There is a direct sensing of liquid pressure by a mechanical-electrical pressure transducer or sensor.
5. It includes a one-piece flow carrier with liquid flow acceleration ability and ease of assembly.
6. A combined heat sink and pressure sensor are mounted in the same unit.
7. The sensor, electronic components and heat sink are concealed inside the module or package.
8. The package may be used with any type of piping system, such as metal or plastic.

FIGS. 12 through 15 show an alternative construction of the flow carrier and the housing for the power or control module and the pressure sensor. Whereas in FIGS. 1 to 11, the bottom part of the housing is formed integrally with the flow carrier, in the embodiment shown in FIGS. 12 to 15 they are separately formed.

The flow carrier 101 of FIGS. 12 to 15 comprises a tubular conduit 102 having threaded coupling portions 103 at its ends and an enlarged portion 104 in the shape of a semi-spherical bulb at its center. The upper side of the bulb 104 forms a round opening 106 and a generally circular flange 107 is formed around the opening 106. Exterior reinforcing ribs 108 (FIGS. 12 and 14) are formed on the underside of the flange, between the flange and the bulb. A ring of mounting holes 109 are formed in the flange 107.

The upper side of the flange 107 and the adjacent portions of the conduit 102 are flat, and the bottom wall of a housing 111 is positioned on the flat surface. An opening 112 having a general contour following the periphery of a cold plate (or heat sink) 113 is formed in the bottom wall of the housing, and the plate 113 plus the housing 111 are secured to the carrier by bolts 114. A pressure sensor 116 and heat generating power control components 117 (FIG. 13) are mounted on the plate 113, as described in connection with FIGS. 2 to 11. While not illustrated, a cover is preferably mounted over the upper side of the housing 111. In other respects, the embodiment of the invention shown in FIGS. 12 to 15 is essentially the same as that shown in FIGS. 2 to 11 and has similar advantages.

Figure 16:
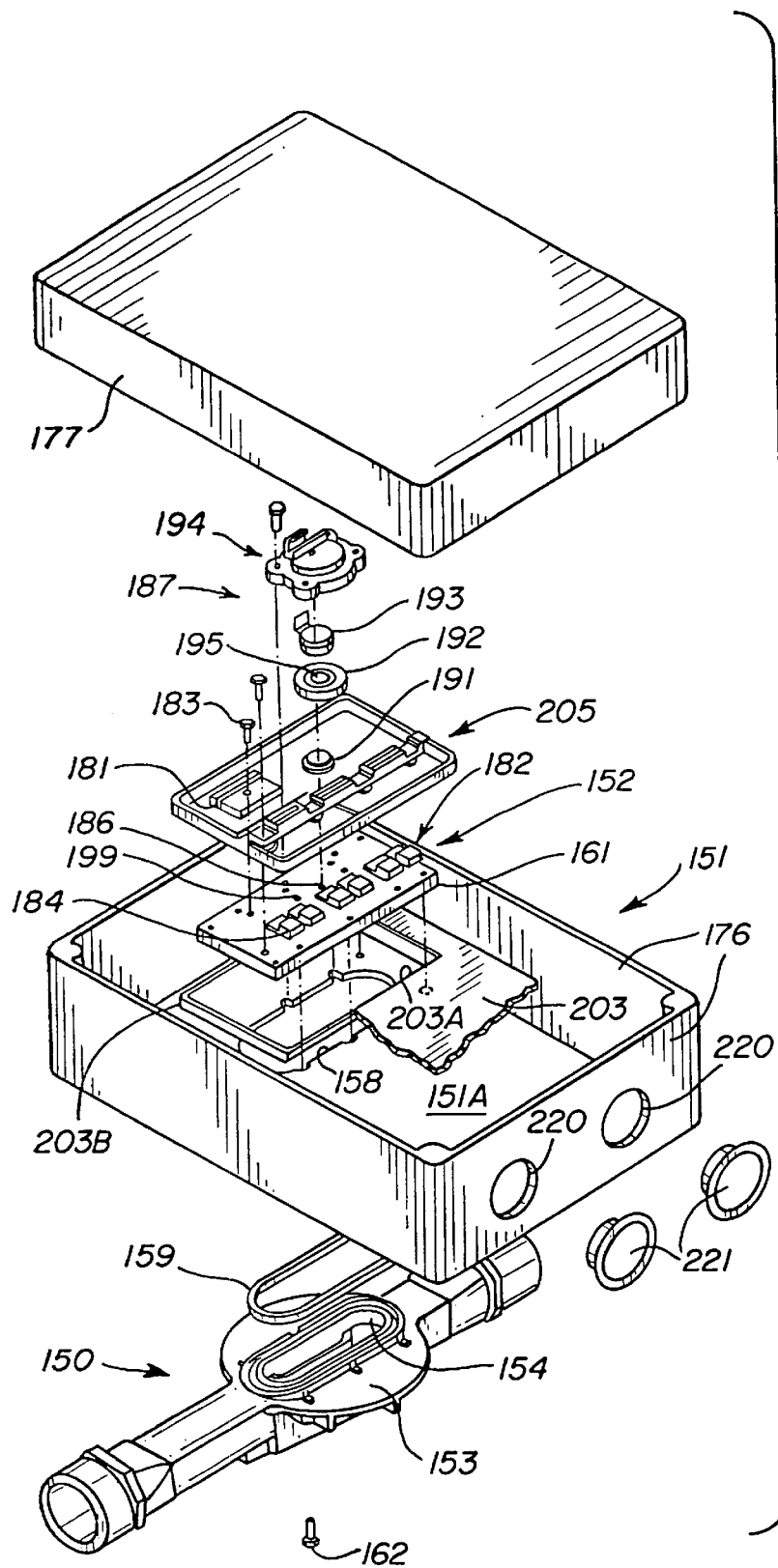
FIG. 16 is an exploded perspective view showing another and preferred apparatus in accordance with the invention.

With reference to FIG. 16, another embodiment of the invention is shown, which has further advantages as will be described. A flow carrier 150 has a control box 151 attached to one side, and heat generating electrical control components 152 are mounted within the box 151. The carrier 150 has a flat upper surface 153 and the flat bottom wall 151A of the control box 151 engages the surface 153. A lengthwise elongated opening 154 (see FIGS. 16 and 27) is formed in the flat surface 153, and a seal groove 156 is formed between two closed form parallel ribs 157 which surround the opening 154. An elongated hole 158 is formed through the bottom wall 151A, and the hole 158 is sized to receive the outermost of the two ribs 157, whereby the two ribs 157 extend through the hole 158. An O-ring 159 is positioned in the groove 156 and extends above the ribs 157 and into tight seal engagement with the flat underside of a heat sink or cold plate 161 (FIG. 16). A plurality of screws 162 (only one shown in FIG. 16) extend through holes 163 formed through the flat surface 153 on the outside of the ribs 157 and are threaded into holes in the underside of the plate 161. Thus, a liquid tight seal is formed around the opening 158, between the surface 153 and the plate 161. The seal 159 is located near the outer periphery of the plate 161 so that most of the bottom surface of the plate 161 is exposed to a liquid flowing through the flow carrier 150. The screws 162 secure the flow carrier 150 to the plate 161 and the edge portion of the bottom wall 151A, around the hole 158, is sandwiched between the surface 153 and the plate 161.

FIGS. 27 to 33 show further details of the flow carrier 150. A liquid flow passage 166 is formed through the carrier 150 between its ends 167, and hex surfaces 168 are provided adjacent the ends 167. The opening 154 is located approximately midway between the ends and the carrier is laterally widened around the opening 154. Strengthening ribs 169 are provided below the flat surface 153, and the passage 166 is shaped to cause the liquid flowing through the passage 166 to move across the bottom surface of the plate 161 which is directly exposed to the liquid, through the opening 154.

The control box 151 (see FIG. 16) further includes side walls 176 which extend upwardly from the bottom wall 151A, and a cover 177 closes the interior of the box. The interior space of the box 151 is preferably sufficiently large to hold other electrical components (not illustrated) such as filters.

The cold plate (or heat sink) 161 is made of a good heat conducting material such as pure copper. As previously described, heat generating electrical components 152 of a control circuit are mounted on the upper surface of the cold plate 161, and in the specific example being described herein, the control circuit includes a rectifier 181 and an inverter 182 of a DC link system. The rectifier 181 has a flat bottom surface which is held tightly against the cold plate 161 by a screw 183. The inverter 182 includes six solid state electronic switches 184, and the mounting of these switches will be described in more detail hereinafter.

As illustrated in FIG. 16, a number of holes are formed in the cold plate 161, and with one exception, the holes either do not extend through the plate or are outside of the seal 159. Most of the holes are tapped to receive mounting screws. The one exception is the hole 186 which extends through the cold plate 161; the lower end of the hole 186 is exposed to the liquid in the flow passage 166 of the carrier 150, and the upper end of the hole 186 is covered by a pressure sensor assembly 187.

The assembly 187 includes a diaphragm 191 (FIG. 16), a diaphragm clamp 192, a pressure sensor 193, and a sensor cup 194 which is shown in detail in FIGS. 21–26. The diaphragm 191 may be generally similar to the diaphragm 58 shown in FIG. 4 and includes a circular central portion surrounded by an annular seal portion. The clamp 192 is annular, having a central hole 195 therein which receives the central portion of the diaphragm 191 (for example, see FIG. 11). The clamp engages and presses the annular seal portion of the diaphragm 191 into sealing engagement with the upper surface of the plate 161 around the hole 186.

With reference to FIGS. 21 to 26, the sensor cup 194 is generally similar to the cup 66 and includes an interior cavity 196 that receives the pressure sensor 193. The bottom side of the cavity 196 is open and fits over the hole 186, with the central portion of the diaphragm 191 and the sensor 193 extending into the cavity 196. Below and around the cavity 196 is formed an annular groove 197 which receives the clamp 192 and the outer seal portion of the diaphragm and holds them in place. The cup 194 thus presses the clamp 192 and the seal portion of the diaphragm 191 downwardly so that the seal portion forms a liquid tight seal with the upper surface of the plate 161. The flexible center portion of the diaphragm engages the underside of the sensor 193, so that the pressure of the liquid in the hole 186 and on the underside of the center portion of the diaphragm presses the center portion upwardly against the sensor 193 which generates an electrical signal representative of the pressure. Two locator pins 198 extend downwardly from the underside of the cup 194 and into two blind holes 199 in the plate 161 on opposite sides of the hole 186, in order to locate the sensor assembly 187 over the hole 186.

Figure 21:
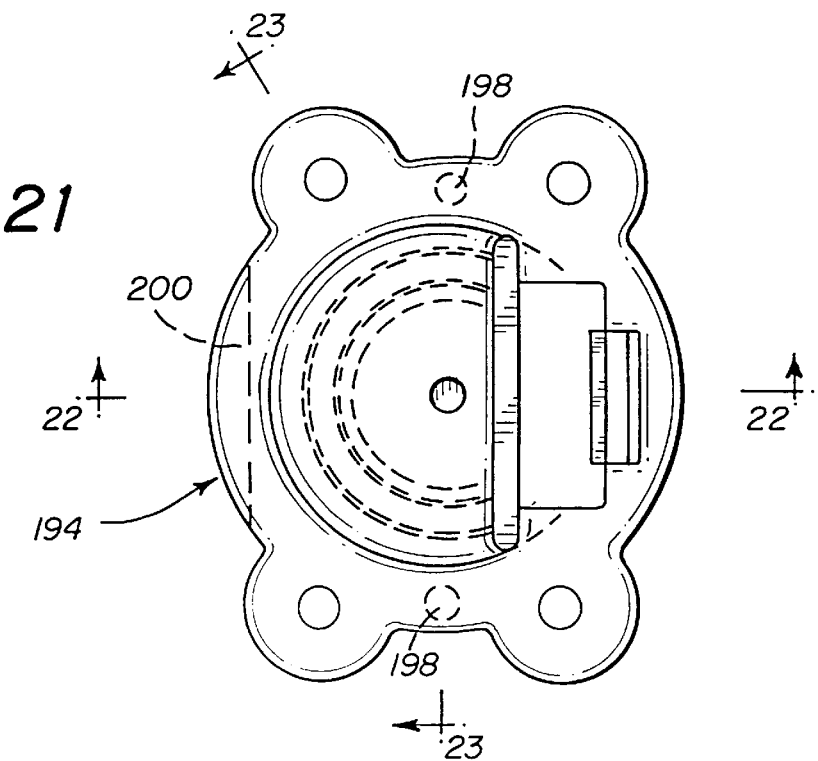
FIG. 21 is a plan view of a sensor cup of the apparatus of FIG. 16.
Figure 22:
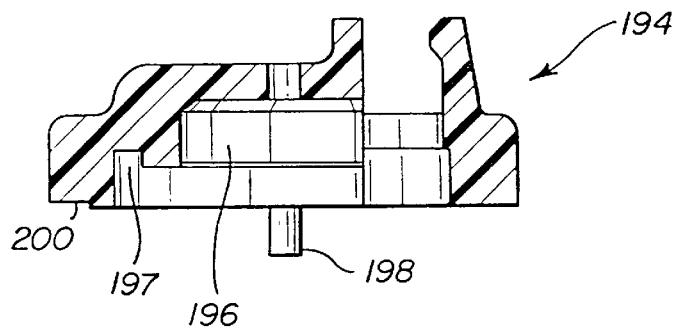
FIG. 22 is a sectional view taken on the line 22—22 of FIG. 21.
Figure 23:
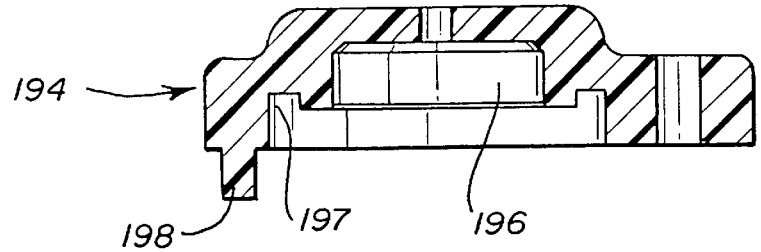
FIG. 23 is a sectional view taken on the line 23—23 of FIG. 21.
Figure 28:
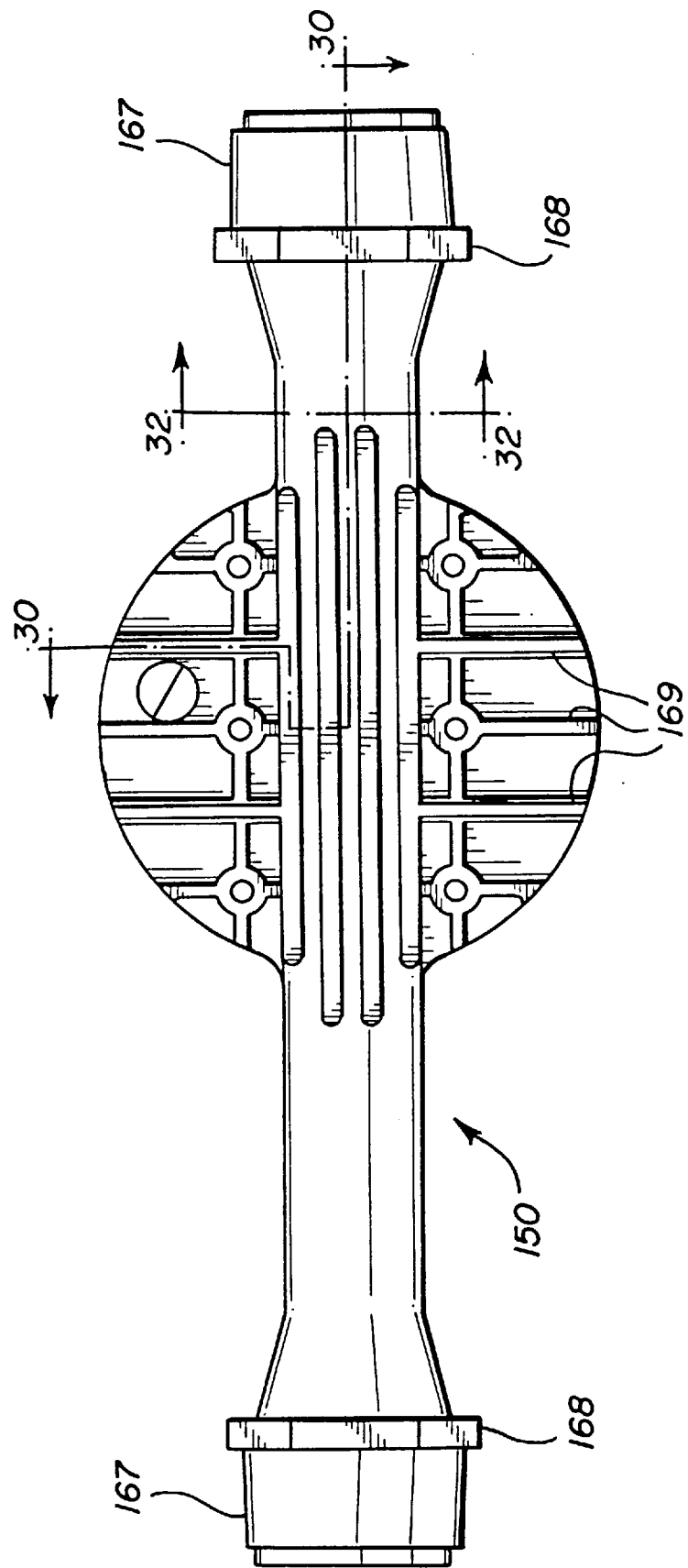
FIG. 28 is a bottom view of the flow carrier of FIG. 27.
Figure 29:
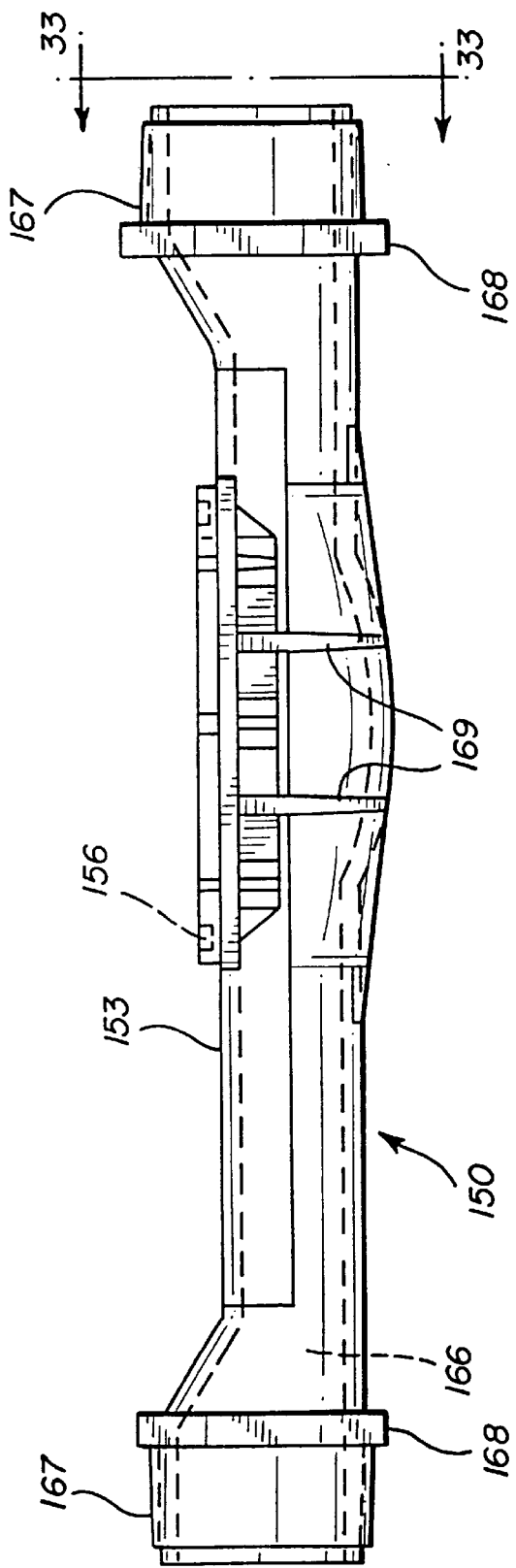
FIG. 29 is a side view of the flow carrier of FIG. 27.
Figure 30:
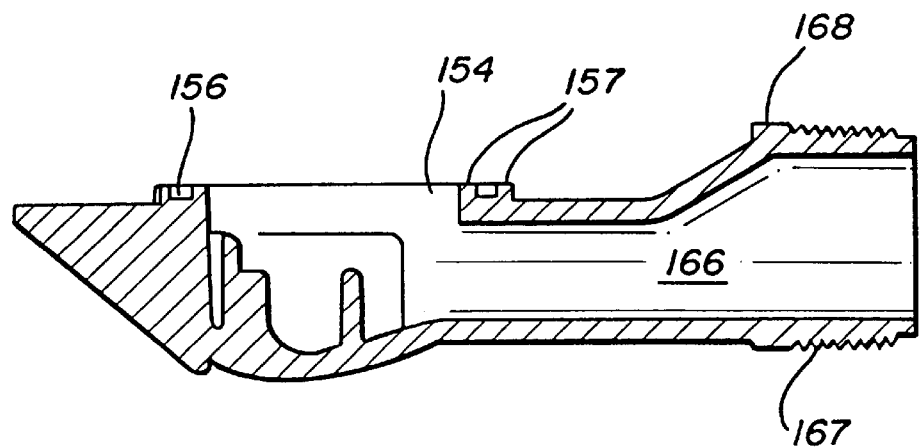
FIG. 30 is a sectional view taken on the line 30—30 of FIG. 28.
Figure 31:
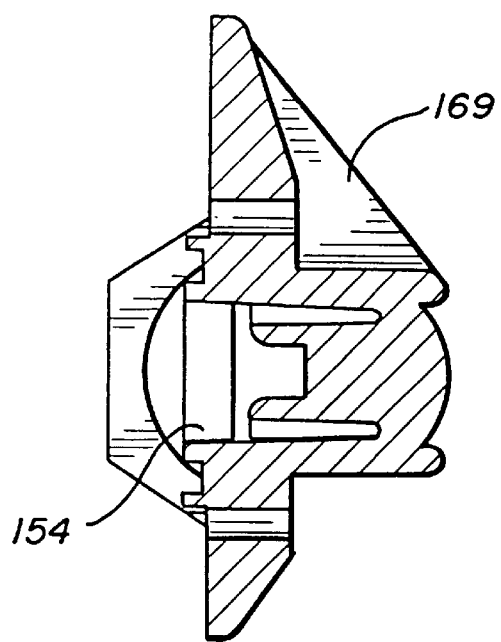
FIG. 31 is a sectional view taken on the line 31—31 of FIG. 27.
Figure 32:
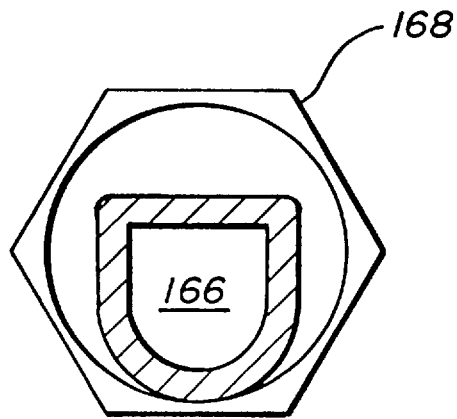
FIG. 32 is a sectional view taken on the line 32—32 of FIG. 28.
Figure 33:
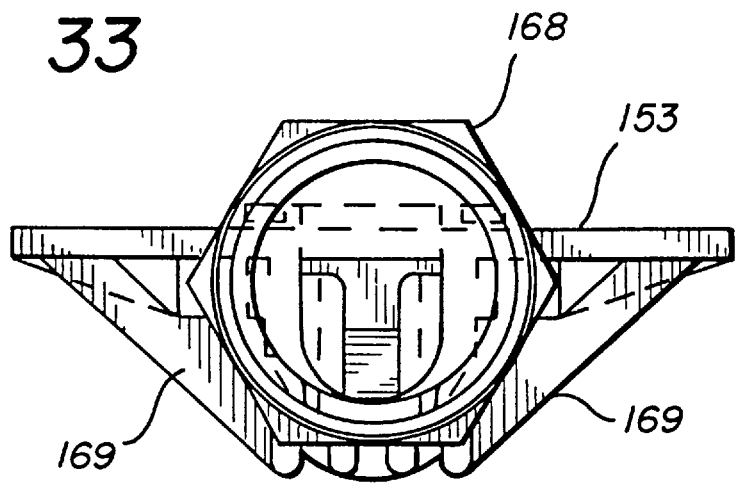
FIG. 33 is a view taken on the line 33—33 of FIG. 29.

With reference to FIGS. 21, 22 and 24, a thin shaving or groove 200 is formed in the bottom surface of the cup 194 on its side which is adjacent the switches 184. The groove 200 provides clearance for a thin strip of insulation under the switches 184.

Figure 17:
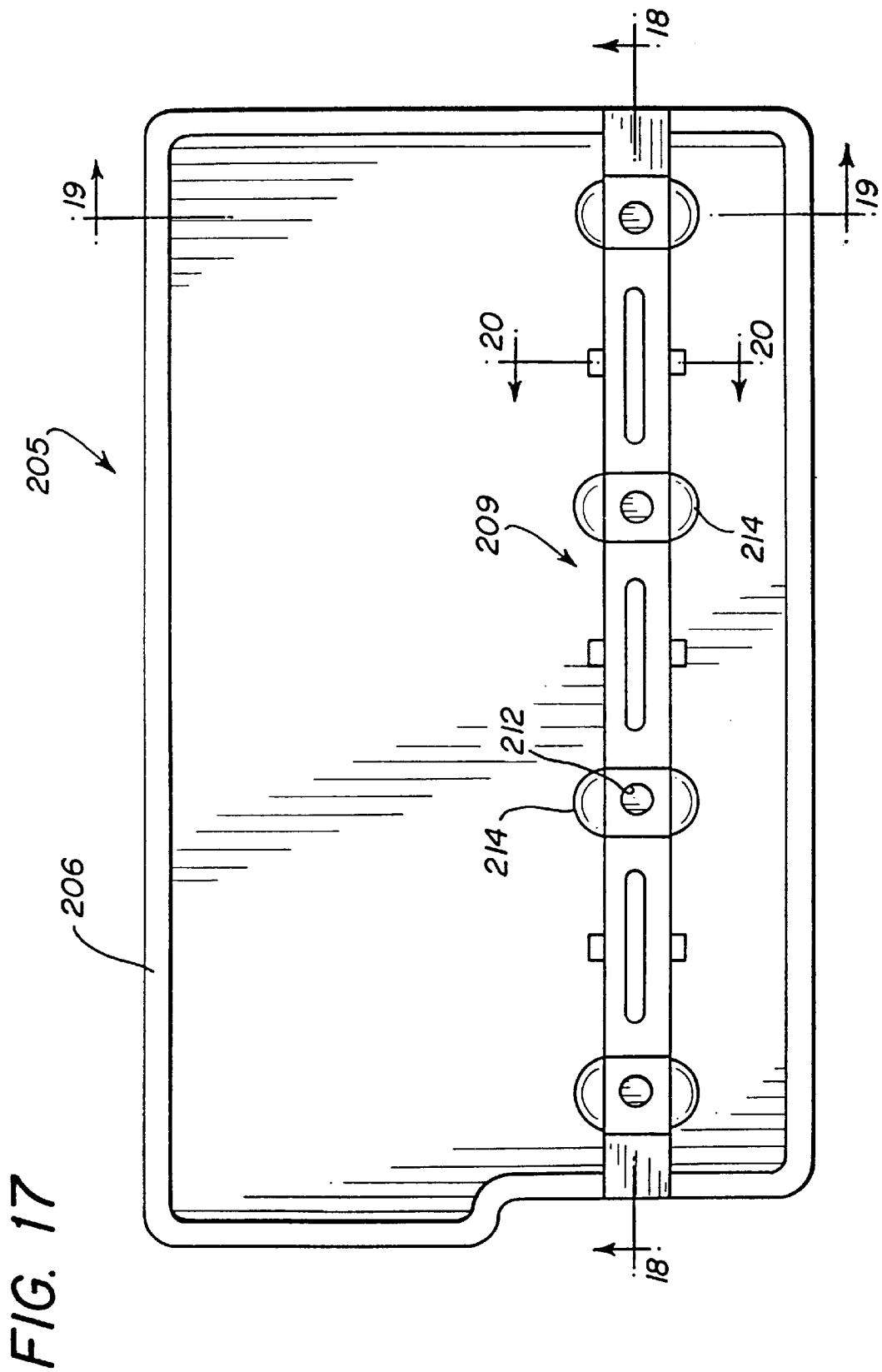
FIG. 17 is a plan view of a component clamp and potting guard of the apparatus of FIG. 16.
Figure 18:
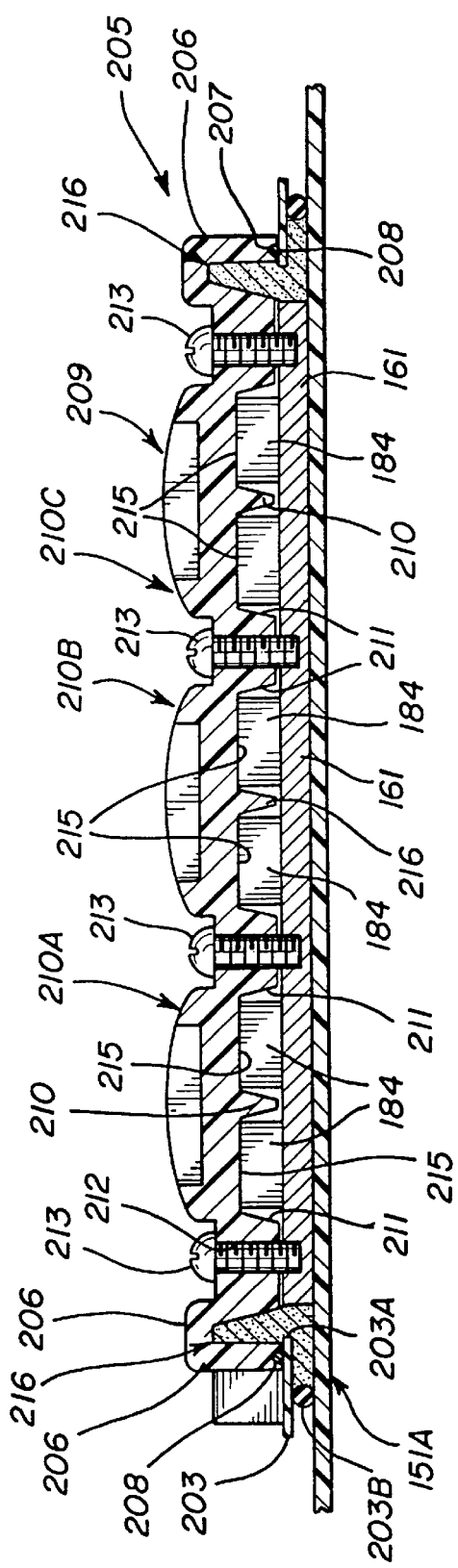
FIG. 18 is a sectional view taken on the line 18—18 of FIG. 17.
Figure 19:
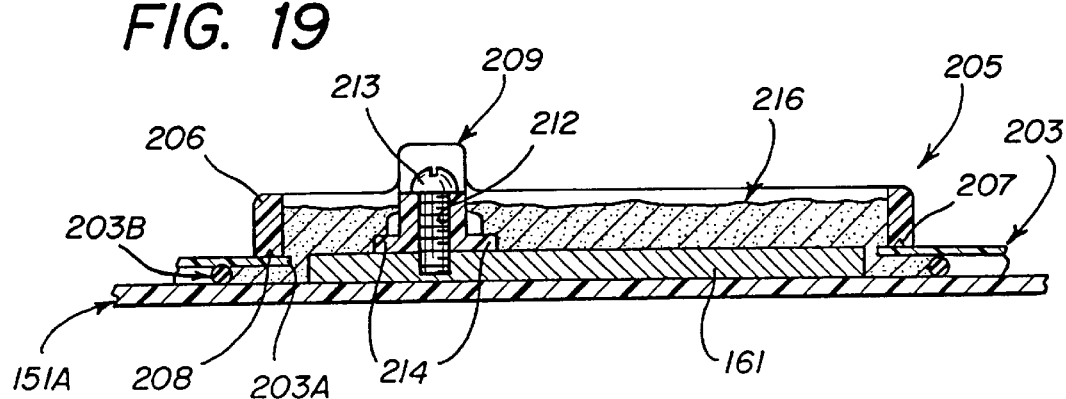
FIG. 19 is a sectional view taken on the line 19—19 of FIG. 17.

FIGS. 17, 18 and 19 illustrate a component clamp and potting guard structure 205 of the apparatus. The structure 205 includes a generally rectangular outer frame 206 having a larger dimension than the outer periphery of the cold plate 161, so that the frame 206 may extend around the plate 161 and rest on the upper surface of a circuit board 203 as shown in FIGS. 18 and 19. As shown in FIG. 16, the flat circuit board 203 has a rectangular opening 203A formed in it; the opening 203A has slightly larger dimensions than the cold plate 161 but slightly smaller dimensions than the frame 206. A gasket or seal 203B is positioned between the board 203 and the upper surface of the bottom 151A. A small groove 207 is formed in the bottom edge of the frame 206 so that a bead 208 of glue or sealant in the groove 207 forms a seal between the circuit board 203 and the underside of the frame 206.

A clamp 209 of the structure 205 extends across the upper surface of the plate 161 between two side walls of the frame 206, as best shown in FIGS. 17 and 18. The frame 206 and the clamp 209 are preferably integrally molded of a plastic material such as 20% glass filled polypropylene or nylon.

Figure 20:
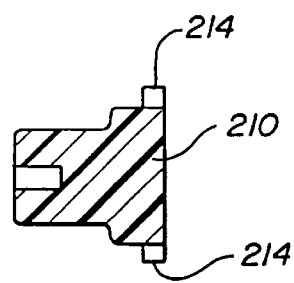
FIG. 20 is a sectional view taken on the line 20—20 of FIG. 17.

The function of the clamp 209 is to hold the six switches 184 of the inverter tightly against the plate 161. However, the previously mentioned thin strip of insulation (not shown, which extends into the groove 200 of the part 194) is clamped in between the switches 184 and the plate 161. As best shown in FIG. 18, three pairs of the switches 184 are positioned in a row on the plate 161, and the clamp 209 presses the switches toward the plate 161. The clamp 209 is formed by three clamp portions 210A, 210B and 210C which are joined together in a row, and the endmost clamp portions 210A and 210C are joined to the frame 206. Each of the clamp portions is vertically and horizontally enlarged and has two recesses 211 formed therein, each of the recesses receiving one of the switches 188 as shown in FIG. 18. At each end of each of the clamp portions 210A, 210B and 210C is formed a hole which receives a screw 213 for tightly securing the clamp 209 to the cold plate 161. The inside upper surface of each of the recesses 211 includes a downwardly extending protrusion 215 which engages a switch 184. Each pair of the recesses 211 is between two of the screw fasteners 213, and, when the screws 213 are tightened, the strip portions 210A, 210B and 210C of the clamp 209 between adjacent screws 213 are pressed down. While the portions of the clamp between two screws may bow or arch, the protrusions 215 engage the center areas of the switches and press the switches squarely and tightly against the plate 161. The clamp 209 has an increased height over the recesses, and an increased width, as indicated at 214 (FIGS. 17 and 19) adjacent the screws 213, to strengthen the clamp. Between the recesses 211 of each pair, the clamp 209 includes downwardly projecting and outwardly extending parts 210 (FIGS. 18 and 20) which separate the switches 184 and also strengthen the clamp.

With reference to FIG. 19, after the switches 184, the clamp 209, the rectifier 181, and the pressure sensor assembly 187 are secured in place on the plate 161 within the frame 206, the upper surface of the plate, around the above components and within the frame 206, is covered by a heat and electrical insulating material 216. In the present instance, the material 216 comprises a conventional potting compound which is poured on the plate 161 in liquid form and then sets or hardens. As shown in FIGS. 18 and 19, the material 216 covers the top and the edges of the cold plate 161, and it flows laterally out to the boundary formed by the frame 206, the seal 203B and the circuit board 203.

The insulating material 216 performs a number of functions. First a portion of the underside of the plate 161 is in contact with the liquid in the flow carrier 150. In a situation where the liquid is quite cold relative to the ambient air, and where the humidity is quite high, condensation would likely form on the upper surface of the cold plate 161 if it were not covered by the heat insulating material 216. Any condensation might collect around the electrical components and damage them, but the material 216 prevents such damage.

Second, the amount of the material 216 is sufficient to cover the lower sides of the clamp 209, the edge portions 214 plus the downward projecting and outward extending parts 210 of the clamp and to completely cover the plate 161. It flows around and surrounds the components on the plate 161 and provides additional security to keep the components in place.

Third, the clamp 209 and the sensor cup 194 are made of a heat and electrical insulating plastic such as polypropylene or nylon and they are tightly secured to the plate 161 by screws. Such materials tend over time to creep or flow away from high pressure areas such as the portions surrounding the fastening screws, causing the initial compression produced by the screws to be lost. This tendency to creep can be counteracted by the material 216 which is rigid once it sets and prevents the edge portions of the clamp 209 and the sensor cup 194 from moving.

With reference to FIG. 16, holes 220 may be formed through the side walls of the box 151 for electrical cables, and removable plugs 221 may be provided for the holes. Wiring leading to and between the electrical components are not illustrated in the drawings, but conventional wiring techniques may be employed. Additional electrical components (not illustrated) which do not generate significant amounts of heat may be mounted on the circuit board 203 within the container 151.

It will be apparent from the foregoing that novel and useful apparatus is described and illustrated. The apparatus forms a compact package or module for sensing the pressure of liquid being pumped and for cooling heat generating components of a control system. The control system is operable to control a motor-pump unit which moves the liquid through the apparatus, whereby the liquid being pumped is utilized to cool the control system. The pressure sensor is directly responsive to the liquid pressure and the components to be cooled are directly mounted on a heat sink which also supports the pressure sensor. Further, the flow carrier is shaped to accelerate the liquid flow across the heat sink for liquid cooling of the heat sink and the components. The pressure sensor includes an improved diaphragm having an O-ring integrally molded on its outer periphery, for forming a seal around the diaphragm. Means is also provided to prevent potentially harmful condensation from forming on the cold plate.

What is claimed is:
1. Liquid flow apparatus comprising:
   a) a pump for a liquid;
   b) an electric motor connected to drive said pump;
   c) a pipe connected to said pump and operable to carry the pumped liquid to a liquid utilization apparatus; and
   d) a control module for controlling said motor, said module comprising
      1) a flow carrier including a conduit connected in said pipe and operable to carry the liquid, said conduit having an opening in a side thereof,
      2) a heat sink on said conduit and over said opening, said heat sink having a wet side exposed to the liquid and a dry side sealed from the liquid, and
      3) at least one heat generating component mounted on said heat sink and cooled by said heat sink and the liquid.

2. Liquid flow apparatus as set forth in claim 1, and further including a heat and electrical insulating material on said dry side of said heat sink, said material extending around the periphery of said heat generating component.

3. Liquid flow apparatus as set forth in claim 2, wherein said dry side of said heat sink has an outer periphery, and further including a frame extending adjacent said outer periphery of said dry side, wherein said insulating material extends to said frame and around said heat generating component.

4. Liquid flow apparatus as set forth in claim 3, and further including clamp means extending across said dry side and within said frame, said clamp means pressing said heat generating component against said dry side, and said insulating material covering edge and lower portions of said clamp means.

5. Liquid flow apparatus as set forth in claim 1, and further including clamp means extending across said dry side, said clamp means pressing said heat generating component against said dry side for securing said heat generating component to said heat sink.

6. Liquid flow apparatus as set forth in claim 3, wherein said clamp means comprises a strip which extends over said heat generating component and fasteners on opposite sides of said component for securing said strip to said heat sink, said strip including a protrusion adjacent said component for engaging and applying pressure on said component.

7. Apparatus as set forth in claim 1, wherein said opening has a diameter in the range of from 1.5 to 5.0 times an outer diameter of said conduit.

8. Apparatus as set forth in claim 1, wherein said conduit includes an enlarged portion, and said opening is formed across said enlarged portion.

9. Apparatus as set forth in claim 8, wherein said enlarged portion includes rib means for accelerating the flow of liquid past said heat sink.

10. Apparatus as set forth in claim 8, wherein said conduit includes two ends connected to said pipe, said enlarged portion and said opening being between said two ends, said conduit further having a substantially rectangular cross-section between each of said ends and said enlarged portion.

11. Apparatus as set forth in claim 10, wherein said ends of said conduit are enlarged for connection with said pipe.

12. Apparatus as set forth in claim 11, wherein said enlarged ends are threaded for attachment with said pipe.

13. Apparatus as set forth in claim 10, wherein said conduit has a flat side between each of said ends and said enlarged portion which is substantially coplanar with said opening in said enlarged portion.

14. Apparatus as set forth in claim 1, wherein the liquid is selected from the group consisting of water and gasoline.

15. Apparatus as set forth in claim 1, wherein said flow carrier is made of plastic and said heat sink is made of a high heat conductive material.

16. Apparatus as set forth in claim 1, wherein said control module further includes a housing on said flow carrier, said housing enclosing said heat sink and said heat generating component.

17. Apparatus as set forth in claim 1, and further including seal means between said heat sink and said conduit for sealing said dry side from said wet side.

18. Apparatus as set forth in claim 1, wherein said heat sink has an opening therethrough from said wet side to said dry side, and further including a flexible diaphragm covering said opening in said heat sink, and a sensor mounted on said dry side and engaging said diaphragm.

19. Apparatus as set forth in claim 18, wherein said sensor comprises a pressure sensor.

20. Apparatus as set forth in claim 18, wherein said diaphragm includes seal means on an outer periphery thereof.

21. Apparatus as set forth in claim 20, wherein said seal means comprises an O-ring formed integrally with said diaphragm.

22. Apparatus as set forth in claim 20, and further comprising a seal clamp encircling said diaphragm and compressing said seal means against said heat sink to form a seal between said heat sink and said diaphragm.

23. Apparatus as set forth in claim 22, wherein said seal means comprises an O-ring formed integrally with said diaphragm, and an annular groove is formed in said seal clamp, said O-ring being located and pressed in said groove.

24. Apparatus as set forth in claim 23, and further comprising a sensor cup positioned over said diaphragm and said seal clamp and secured to said heat sink, wherein said sensor is mounted within said sensor cup.

25. Apparatus for monitoring pressure in a pipe, comprising a liquid flow carrier having inlet and outlet ends connectable with said pipe, an opening formed in said carrier between said ends, a plate fastened to said carrier over said opening, pressure sensing means including electronic circuitry, said pressure sensing means being mounted on said plate and exposed to pressure in said flow carrier, and seal means between said flow carrier, said plate and said pressure sensing means.

26. Apparatus as set forth in claim 25, wherein said plate has an aperture formed therein, and said pressure sensing means comprises a diaphragm covering said aperture and a pressure sensor engaging said diaphragm.

27. Apparatus as set forth in claim 25, and further comprising pump means for producing liquid flow in said pipe and in said carrier, said pressure sensing means being operable to control said pump means.

* * * * *